United States Patent
Ullman et al.

(10) Patent No.: US 8,275,717 B2
(45) Date of Patent: Sep. 25, 2012

(54) SOURCE- AND VENUE-SPECIFIC INVENTORY DATA PROCESSING AND IDENTIFICATION SYSTEM

(75) Inventors: Matthew Royce Ullman, Seattle, WA (US); Brian T. Worsham, Maple Valley, WA (US); Douglas George Orman Leonard, Port Orchard, WA (US)

(73) Assignee: ADP Dealer Services, Inc., Seattle, WA (US)

( * ) Notice: Subject to any disclaimer, the term of this patent is extended or adjusted under 35 U.S.C. 154(b) by 1157 days.

(21) Appl. No.: 11/525,009

(22) Filed: Sep. 21, 2006

(65) Prior Publication Data

US 2007/0282713 A1 Dec. 6, 2007

Related U.S. Application Data

(63) Continuation of application No. 11/446,011, filed on Jun. 2, 2006.

(51) Int. Cl.
G06F 21/00 (2006.01)
G06Q 10/00 (2012.01)
(52) U.S. Cl. .............................. 705/51; 705/28; 705/300
(58) Field of Classification Search .................... 705/28, 705/51, 300
See application file for complete search history.

(56) References Cited

U.S. PATENT DOCUMENTS

| | | | |
|---|---|---|---|
| 4,992,940 A | 2/1991 | Dworkin | |
| 5,521,815 A | 5/1996 | Rose, Jr. ..................... | 364/409 |
| 5,694,595 A | 12/1997 | Jacobs et al. | |
| 5,790,785 A | 8/1998 | Klug et al. | |
| 5,974,418 A | 10/1999 | Blinn et al. | |
| 5,978,776 A | 11/1999 | Seretti et al. ..................... | 705/26 |
| 6,003,635 A | 12/1999 | Bantz et al. | |
| 6,006,201 A | 12/1999 | Berent et al. | |
| 6,009,410 A | 12/1999 | LeMole et al. | |
| 6,041,310 A | 3/2000 | Green et al. | |
| 6,070,164 A | 5/2000 | Vagnozzi | |
| 6,134,532 A | 10/2000 | Lazarus et al. | |
| 6,397,226 B1 | 5/2002 | Sage ......................... | 707/104.1 |
| 6,421,733 B1 | 7/2002 | Tso et al. | |
| 6,496,855 B1 | 12/2002 | Hunt et al. | |
| 6,556,904 B1 * | 4/2003 | Larson et al. ................... | 701/33 |
| 6,654,726 B1 * | 11/2003 | Hanzek ......................... | 705/26 |
| 6,728,685 B1 * | 4/2004 | Ahluwalia ..................... | 705/26 |
| 6,738,750 B2 | 5/2004 | Stone et al. | |
| 6,795,819 B2 | 9/2004 | Wheeler et al. ................... | 707/3 |

(Continued)

OTHER PUBLICATIONS http://web.archive.org/web/20010718130244/http://chromedata.com/maing2/about/index.asp.*
Final Office Action mailed Jul. 6, 2011, in U.S. Appl. No. 11/350,795, filed Jan. 24, 2003, 26 pgs.
Understanding X.500—The Directory. Chadwick, D.W. Available at http://sec.cs.kent.ac.uk/x500book/. 1996. Entire work cited.

(Continued)

Primary Examiner — Ryan Zeender
Assistant Examiner — Dana Amsdell
(74) Attorney, Agent, or Firm — John R. Thompson; Stoel Rives LLP

(57) ABSTRACT

A system processes product data including values for a product data record corresponding to a product style. A network interface receives a product data record over a network from a source. A memory has stored thereon computer readable instruction code, including, a rule set having rules associated with the product data record, and a processing manager to apply the rules to the product data record and determine availability of values to a venue. The processing manager includes a style identification manager to determine from among the available values a product style associated with the available values, and to make the product style available to the venue based on the rules.

46 Claims, 9 Drawing Sheets

U.S. PATENT DOCUMENTS

| | | | |
|---|---|---|---|
| 6,901,430 B1 * | 5/2005 | Smith | 709/206 |
| 6,917,941 B2 * | 7/2005 | Wight et al. | 1/1 |
| 6,922,674 B1 | 7/2005 | Nelson | |
| 6,944,677 B1 | 9/2005 | Zhao | |
| 6,978,273 B1 | 12/2005 | Bonneau et al. | |
| 6,981,028 B1 | 12/2005 | Rawat et al. | |
| 7,028,072 B1 | 4/2006 | Kliger et al. | |
| 7,031,554 B2 | 4/2006 | Iwane | |
| 7,171,418 B2 | 1/2007 | Blessin | |
| 7,197,764 B2 | 3/2007 | Cichowlas | |
| 7,240,125 B2 | 7/2007 | Fleming | |
| 7,246,263 B2 | 7/2007 | Skingle | |
| 7,281,029 B2 | 10/2007 | Rawat | |
| 7,433,891 B2 * | 10/2008 | Haber et al. | 1/1 |
| 7,496,543 B1 | 2/2009 | Bamford et al. | |
| 7,548,985 B2 | 6/2009 | Guigui | |
| 7,587,504 B2 | 9/2009 | Adams et al. | |
| 7,593,925 B2 | 9/2009 | Cadiz et al. | |
| 7,657,594 B2 | 2/2010 | Banga et al. | |
| 7,778,841 B1 | 8/2010 | Bayer et al. | |
| 7,801,945 B1 | 9/2010 | Geddes et al. | |
| 7,865,409 B1 * | 1/2011 | Monaghan | 705/28 |
| 2002/0032626 A1 | 3/2002 | DeWolf et al. | 705/35 |
| 2002/0059260 A1 * | 5/2002 | Jas | 707/100 |
| 2002/0065739 A1 | 5/2002 | Florance et al. | |
| 2002/0069110 A1 | 6/2002 | Sonnenberg | |
| 2002/0082978 A1 | 6/2002 | Ghouri et al. | |
| 2002/0107739 A1 * | 8/2002 | Schlee | 705/14 |
| 2002/0143646 A1 | 10/2002 | Boyden et al. | 705/26 |
| 2002/0198761 A1 | 12/2002 | Ryan et al. | |
| 2003/0036964 A1 | 2/2003 | Boyden et al. | 705/26 |
| 2003/0046179 A1 | 3/2003 | Anabtawi et al. | |
| 2003/0177050 A1 * | 9/2003 | Crampton et al. | 705/8 |
| 2003/0233246 A1 | 12/2003 | Snapp et al. | 705/1 |
| 2004/0012631 A1 | 1/2004 | Skorski | |
| 2004/0039646 A1 * | 2/2004 | Hacker | 705/22 |
| 2004/0073546 A1 | 4/2004 | Forster et al. | |
| 2004/0073564 A1 | 4/2004 | Haber et al. | 707/101 |
| 2004/0088228 A1 | 5/2004 | Mercer et al. | 705/28 |
| 2004/0128320 A1 | 7/2004 | Grove et al. | 707/104.1 |
| 2004/0139203 A1 | 7/2004 | Graham, Jr. et al. | |
| 2004/0181464 A1 * | 9/2004 | Vanker et al. | 705/26 |
| 2004/0220863 A1 | 11/2004 | Porter et al. | |
| 2004/0225664 A1 | 11/2004 | Casement | 707/100 |
| 2005/0015491 A1 | 1/2005 | Koeppel | |
| 2005/0065804 A1 | 3/2005 | Worsham et al. | |
| 2005/0268282 A1 | 12/2005 | Laird | |
| 2005/0289599 A1 * | 12/2005 | Matsuura et al. | 725/53 |
| 2006/0129423 A1 * | 6/2006 | Sheinson et al. | 705/1 |
| 2007/0150368 A1 | 6/2007 | Arora et al. | |
| 2007/0209011 A1 * | 9/2007 | Padmanabhuni et al. | 715/762 |
| 2007/0271330 A1 | 11/2007 | Mattox et al. | |
| 2007/0288413 A1 * | 12/2007 | Mizuno et al. | 706/46 |

OTHER PUBLICATIONS

Internet Archive Wayback Machine, archive of LDAP Browser. com—FAQ. Archived Dec. 11, 2000. Available at http://web.archive.org/web/20001211 0152/http://www.idapbrowser.com/faq/faq.ph3?sID=fe4ae66f2f023d86909f35e974f3a1ce.

Internet Archive Wayback Machine, archive of LDAP Browser. com—Product Info. Archived Dec. 11, 2000. Available at http://web.archive.org/web/20001211 0541/http:www.Idapbrowser.com/prodinfo/prodinfo.php3?sID=fe4ae66f2f023d86909f35e974f3a1ce.

Office Action mailed Nov. 14, 2011 for U.S. Appl. No. 11/524,602, filed Sep. 21, 2006.

Office Action mailed Sep. 17, 2007 in U.S. Appl. No. 10/665,899, filed Sep. 18, 2003.

Office Action mailed Jul. 7, 2008 in U.S. Appl. No. 10/665,899, filed Sep. 18, 2003.

Office Action mailed Nov. 13, 2008 in U.S. Appl. No. 10/665,899, filed Sep. 18, 2003.

Office Action mailed May 11, 2009 in U.S. Appl. No. 10/665,899, filed Sep. 18, 2003.

Office Action mailed Sep. 14, 2009 in U.S. Appl. No. 10/665,899, filed Sep. 18, 2003.

Office Action mailed Nov. 27, 2009 in U.S. Appl. No. 11/446,011, filed Jun. 2, 2006.

Office Action mailed Dec. 11, 2009 in U.S. Appl. No. 11/524,602, filed Sep. 21, 2006.

Office Action mailed Feb. 24, 2010 in U.S. Appl. No. 10/665,899, filed Sep. 18, 2003.

Office Action mailed Jun. 8, 2010 in U.S. Appl. No. 11/446,011, filed Jun. 2, 2006.

Office Action mailed Jul. 27, 2010 in U.S. Appl. No. 11/524,602, filed Sep. 21, 2006.

Office Action mailed Aug. 30, 2010 in U.S. Appl. No. 10/665,899, filed Sep. 18, 2003.

Office Action mailed Oct. 14, 2010 in U.S. Appl. No. 12/243,855, filed Oct. 1, 2008.

Office Action mailed Nov. 8, 2010 in U.S. Appl. No. 12/243,861, filed Oct. 1, 2008.

Notice of Allowance mailed Nov. 22, 2010 in U.S. Appl. No. 12/243,855, filed Oct. 1, 2008.

Office Action mailed Mar. 1, 2011 in U.S. Appl. No. 11/446,011, filed Jun. 2, 2006.

Office Action mailed Mar. 8, 2011 in U.S. Appl. No. 10/665,899, filed Sep. 18, 2003.

Office Action mailed Mar. 17, 2011 in U.S. Appl. No. 12/243,852, filed Oct. 1, 2008.

Final Office Action mailed Jun. 26, 2012, in U.S. Appl. No. 11/524,602, filed Sep. 21, 2006, 11 pgs.

* cited by examiner

| Venue | www.AudiWyoming.com 312 | | | | | www.CodysCarRanch.com 310 | | | | | www.SunDanceNissan.com 316 | | | | |
|---|---|---|---|---|---|---|---|---|---|---|---|---|---|---|---|
| Source | Audi | | | | DMS | | | | | Audi | | | | | DMS | | | | |
| Field | a | b | c | d | e | a | b | c | d | e | a | b | c | d | e | a | b | c | d | e | a | b | c | d | e | a | b | c | d | e |
| After Adding System Created Value 458 | - | 1 | 2 | 3 | - | - | - | - | - | - | - | - | - | - | - | - | - | - | - | - | - | - | - | - | - | 460 4 | - | 5 | 3 | 462 7 |
| After Applying Venue-Based Transformation Rule 452 | - | 1 | 2 | 3 | - | - | - | - | - | - | - | - | - | - | - | - | - | - | - | - | 4 | - | 5 | 456 3 | - |
| After Applying Venue-Availability Rules 420 | 424 1 | - | 2 | 448 3 | - | 426 - | - | - | - | - | - | - | 442 - | 3 | - | 4 | 434 4 | 5 | 450 3 | - | 436 4 | - | 5 | 3 | - |
| After Applying Source-Availability Rules 406 | - | 414 1 | 2 | 3 | - | 432 - | - | 5 | 3 | - | 410 - | - | 2 | 3 | - | 4 | 416 - | 5 | 454 6 | - | 4 | 418 - | 5 | 3 | - |
| Default 404 | - | 1 | 2 | 3 | - | - | - | 5 | 3 | - | - | 1 | 2 | 3 | - | 4 | - | 5 | 3 | - | 4 | - | 5 | 3 | - |
| Field | a | b | c | d | e | a | b | c | d | e | a | b | c | d | e | a | b | c | d | e | a | b | c | d | e | a | b | c | d | e |

408

Vehicle Data Records 112

| Field | (a) Mileage | (b) Model Code | (c) Drive Wheels | (d) Exterior Color | (e) New Field (System Derived) |
|---|---|---|---|---|---|
| Record # | Source | | | | |
| 1 402 | Audi | - (null) 422 | 1 | 2 438 | 3 444 | |
| 2 428 | DMS | 4 430 | - (null) 412 | 5 440 | 3 446 | |

FIGURE 4

SOURCE- AND VENUE-SPECIFIC INVENTORY DATA PROCESSING AND IDENTIFICATION SYSTEM

RELATED APPLICATIONS

This application is a continuation of, and claims priority to, U.S. patent application Ser. No. 11/446,011 filed on Jun. 2, 2006 and entitled "SOURCE- AND VENUE-SPECIFIC INVENTORY DATA PROCESSING AND IDENTIFICATION SYSTEM," which is hereby incorporated by reference.

TECHNICAL FIELD

This disclosure relates generally to the management of product (goods or services) inventory information, and more particularly to a system for appropriately processing inventory data based on the source of the data and the venue to which information about the inventory may be made available, including identifying the most granular standard product data class with which a given item of inventory should be associated using heterogeneous data about the inventory items that may vary in terms of content and format.

BRIEF DESCRIPTION OF THE DRAWINGS

Non-limiting and non-exhaustive embodiments of the disclosure are described, including various embodiments of the disclosure with reference to the Figures, in which:

FIG. 4 is a chart illustrating values available to venues of FIG. 3;

DETAILED DESCRIPTION OF EXEMPLARY EMBODIMENTS

The embodiments of the disclosure will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of the embodiments of the apparatus, system, and method of the disclosure, as represented in FIGS. 1 through 9, is not intended to limit the scope of the disclosure, as claimed, but is merely representative of possible embodiments of the disclosure.

In some cases, well-known structures, materials, or operations are not shown or described in detail. Furthermore, the described features, structures, or characteristics may be combined in any suitable manner in one or more embodiments. It will also be readily understood that the components of the embodiments as generally described and illustrated in the Figures herein could be arranged and designed in a wide variety of different configurations.

The order of the steps or actions of the methods described in connection with the embodiments disclosed may be changed as would be apparent to those skilled in the art. Thus, any order in the Figures or Detailed Description is for illustrative purposes only and is not meant to imply a required order, unless specified to require an order.

Several aspects of the embodiments described will be illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Figure 1:
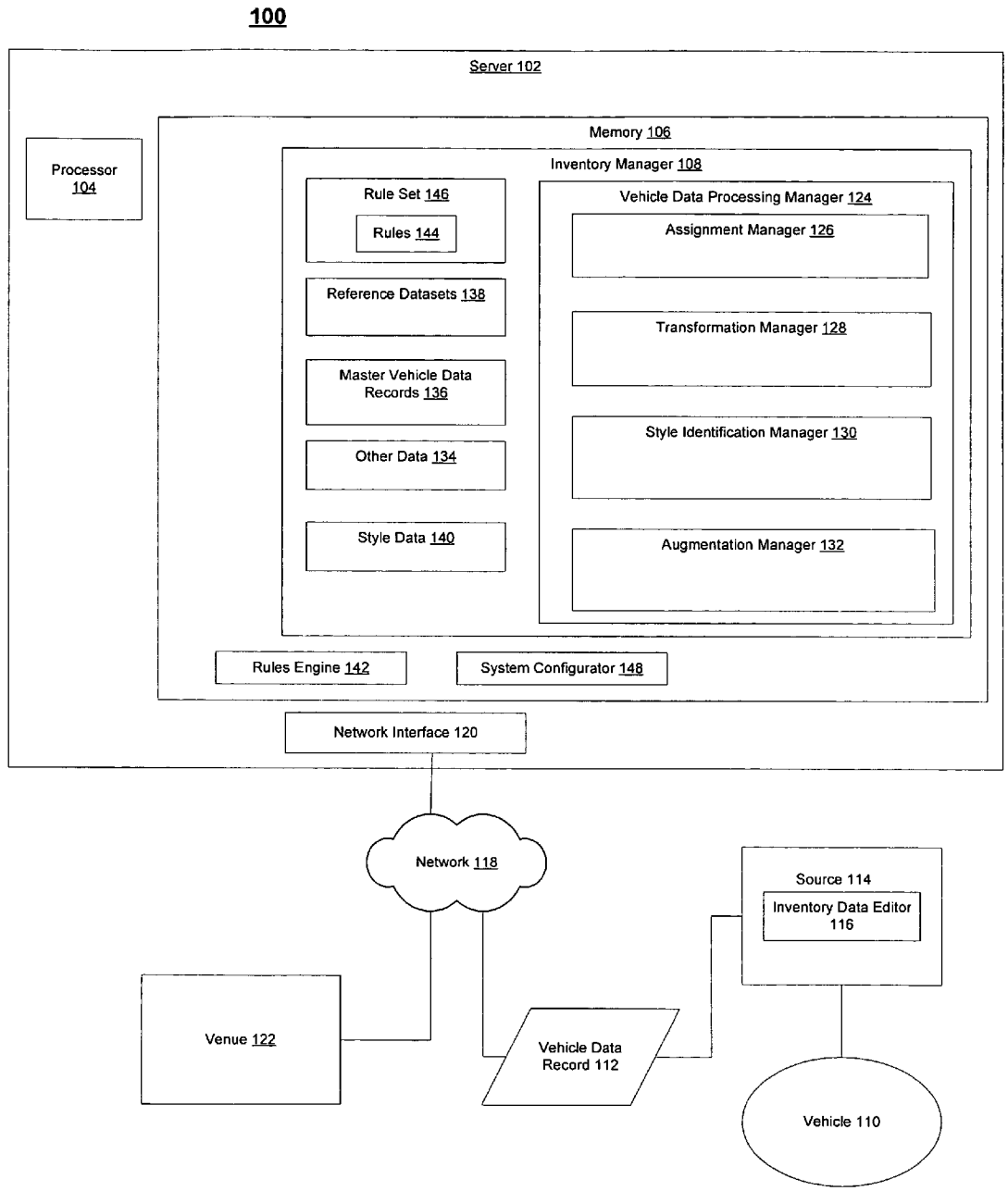
FIG. 1 is a block diagram of an embodiment of an inventory data processing and identification system involving automotive passenger vehicles.

Referring to FIG. 1, a block diagram is shown of one embodiment of a source- and venue-specific inventory data processing and identification system (or system) 100, which may be substantially or completely automated. The system 100 may be operable on a computer or server 102 having a processor 104. The processor 104 may include a general purpose device such as a 80.times.86, Pentium (mark of Intel), 680.times.0, microcontroller, or other "off-the-shelf" microprocessor. The processor may include a special purpose processing device such as an ASIC, PAL, PLA, PLD, Field Programmable Gate Array, or other customized or programmable device.

The system 100 further includes a memory 106 for storing computer readable instructions and data. Suitable software to assist in implementing the invention is readily provided by those of skill in the pertinent art(s) using the teachings presented here and programming languages and tools such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s). The memory 106 may include static RAM, dynamic RAM, flash memory, ROM, CD-ROM, disk, tape, magnetic, optical, or other computer storage medium. An inventory manager 108 may be stored in whole or in part on the memory 106.

In illustrative embodiments, the inventory product instances managed by the system 100 are automotive passenger vehicles (cars, trucks, minivans, SUVs, etc.) 110 (hereinafter "vehicles" 110), which may be thought of as mass-produced but highly configured products of high value. Although some aspects of the illustrative embodiment are specific to the automotive industry, one skilled in the art of inventory data systems will appreciate the applicability to any industry that may process product instance data to expose, standardize, enhance or augment it for inventory management and display purposes, among other things.

Commonly, instance-level data about a particular unique vehicle 110 arrives at the system 100 in the form of one or more vehicle data records or files (hereinafter "vehicle data record") 112 that correspond to each vehicle 110 to be processed within it. Each vehicle data record 112 may be obtained by the system 100 in an automated or manual manner from one of multiple possible vehicle data record sources (hereinafter "source") 114 that have created it, such as an individual vehicle owner, a manufacturer, a franchised or independent auto dealership, a dealership vehicle data collection agent (e.g., a concierge service or other type of dealer service provider), or some other possessor of data about the vehicle. One or more sources 114 may provide one or more vehicle data records 112 to the system 100 for one or more vehicles 110.

For example, an entity associated with a vehicle 110, such as a private owner or a dealership employee, may serve as a source 114 by employing a software application, such as an inventory data editor 116 that provides a manual user interface to the system 100 in order to create and submit an initial or subsequent vehicle data record 112 pertaining to the vehicle 110. In addition, a feed from a source's 114 computerized information system, such as an auto dealership's computer management system (dealer management system or "DMS"), a concierge service's computer system, or an auto manufacturer's (OEM's) computer system may also automatically send vehicle data records 112, including one or more corresponding to the same vehicle 110, to the system 100.

A vehicle data record 112 may contain information about standard, configured, individualized, and/or distinctive aspects of its corresponding vehicle 110, such as non-universal or state-dependent (such as based on physical condition) information that may be unique to it. For example, a vehicle data record 112 may contain various kinds of information about a new or used vehicle's attributes arranged in fields, such as classification information of a taxonomic nature (year, make, model, trim), descriptive text about the vehicle's equipment, features, amenities, pricing, condition, and mileage, and photos, as well as structured codes, such as standard VIN and manufacturer model, option, package, and color codes that may need to be de-coded or "translated" to more meaningful text in order to be more useful to shoppers and others interested in the vehicle 110.

The vehicle data record 112, including both the above-described information and any meta-data, is directly or indirectly forwarded from a source 114 to the system 100 over a network 118 and using a network interface 120 of the server 102. The network 118 may include the Internet or World Wide Web, or an intranet, such as a LAN or WAN, or any other network of communicating computerized devices having a memory. The network may include communications or networking software such as the software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires" known to those of skill in the art. The network may encompass smaller networks and/or be connectable to other networks through a gateway or similar mechanism.

The server 102 may initially filter a vehicle data record 112. For example, initial filtering may involve vehicle data record 112 processing that is universal to the system 100. Such processing may include removal of certain network transport-created characters from field values, modification of the case of text values, and transformation of certain text values to a standard value. Among other things, "meta-data" within the vehicle data record 112 may include source- and vehicle-identifying information.

"Source-identifying" and "vehicle-identifying" refers to a vehicle data record 112 being associated with identifying information about the record source 112 and the vehicle instance 110, which may be necessary as its data passes through certain stages or modules of the system 100. At necessary points, a vehicle data record's data may include sufficient source- and vehicle-identifying information so as to enable the system 100 to uniquely associate it with the specific source 114 of the record and the actual vehicle instance 110 to which these data pertain. In the United States, the Vehicle Identification Number (VIN) commonly serves to identify a unique vehicle 110 when it is present in a data record. Among other things, a dealership-assigned inventory stock number, when coupled with dealership identifying information, and retail-owner identifying information, when coupled with taxonomic vehicle label information, such as year, make, and model, may also be used to uniquely identify a vehicle 110 in systems, such as the system 100. Techniques for doing so are well known in the art.

Identity of the source 114 and vehicle 110 may be explicit in the vehicle data record 112 when it arrives at the system 100, or may be inferred from it by using, among other things, meta-data in the vehicle data record 112. In one implementation, vehicle data record meta-data pertaining to the source 114 and vehicle 110 may be mapped within the system 100 to internal source- and vehicle-specific identifiers. These system-specific identifier values are then appended to the vehicle data record 112 or its individual data elements before they pass further through the system 100.

The system 100 may include a number of modules and sub-modules for communicating electronically with databases resident in memory 106, and for linking pertinent data throughout memory 106 to a record of any given database. As discussed, the memory 106 may be resident on a single server 102 or found across several memory devices. In one embodiment, the system 100 may be implemented as a number of modular components comprising a broad, multi-functional inventory management system (or "inventory manager") 106 based on object-oriented (OO) software design principles and a service-oriented architecture (SOA). In such an embodiment, the system 100 may be implemented as a Java 2 Platform Enterprise Edition (J2EE) system that tends to perform business processing on the server-side and some presentation logic on the thin-client-side. In this embodiment, service components may be implemented as Stateless Session Enterprise JavaBeans (EJBs), and among other things, client presentation may be accomplished through some combination of HTML and Javascript, much of it dynamically generated by JavaServer Pages (JSPs). Judicious use of Java applets and Flash files may also be allowed. Import and export processes employing scripts and daemons may perform file transfers at the edges of the system 100 in order to accommodate the system's 100 data import and export needs.

The system 100 includes one or more venues 122 which are destinations that selectively receive information from a vehicle date record 112. Venue 122 refers to an information destination that may be controlled or governed ("sponsored") by one or more entities and to which some data about the vehicle 110 may be made available for possible use. A venue includes the smallest defined destination to which customized information may be made available to one or more "audiences", such as people and/or automated systems. Each participant in the audience may be determined to have a common trait relating to the information or object, so that the audience has a status in the system and information is customized to meet the defined needs of the audience. Whether, which, and how a vehicle data value is actually used by the venue 122 may be determined, among other things, by usage rules and data processing mechanisms of the venue 122. Non-exhaustive examples of types of venues 122 include websites, on-line or print classified vehicle listings, and other software applications such as lead management and customer relationship management systems.

The inventory manager 108 includes a vehicle processing manager 124 may use the vehicle identifying information to associate a vehicle data record 112 and its contents with other records for the same vehicle 110 in order, among other things, to determine by means of filtering logic whether, how, and by which venues 122 information within a vehicle data record 112 may be further utilized. Subsets of vehicle processing manager 124 functionality may be further represented by a series of sub-modules responsible for different types and stages of vehicle data processing. These sub-modules include a vehicle data assignment manager (hereinafter, "assignment manager") 126, vehicle data transformation manager (hereinafter, "transformation manager") 128, vehicle style identification manager (hereinafter, "style identification manager") 130, and vehicle data augmentation manager (hereinafter, "augmentation manager") 132.

The functionality subsumed by the assignment manager 126 pertains to determining to which venues 122 information within a vehicle data record 112 for a vehicle 110 associated with a venue 122 may be made available for possible use. The functionality subsumed by the transformation manager 128 pertains to determining how the available vehicle data for a venue 122 may be modified for possible use by the venue 122, including changing values to an equivalent standard value.

The functionality subsumed by the style identification manager 130 pertains to determining from the available vehicle data for a venue 122 the smallest subset of all possible "granular normal product classes" or "styles", from within each of one or more product classification schemas that may serve for various reasons as internal standard classifications for the system 100, to which a vehicle 110 may best correspond for possible use by the venue 122. In the automotive passenger vehicle industry, the classification of granular normal product classes (sometimes referred to as "base trims") established by the auto maker itself may often be selected as the basis for an internal system standard style classification against which a vehicle instance's style may be determined. However, the style identification manager 130 may be embodied to determine the smallest subset of styles within which a vehicle instance falls from amongst one or more of multiple classifications employed as different system internal standards for various purposes.

Finally, completing this overview of vehicle processing manager 124 sub-modules, the functionality subsumed by the augmentation manager 132 pertains to determining how the available vehicle data for a venue 122 may, based on the identified style, be augmented or added to for possible use by the venue 122. The functioning of the vehicle processing manager 124 and its sub-modules will be discussed in greater detail below.

In order to associate multiple vehicle data records 112 for a vehicle 110, if initial filtering has not already standardized a vehicle's 110 unique identifier within its associated vehicle data records 112, the assignment manager 126 may rely on other database tables in other data 134 that map different unique identifiers for the same vehicle instance, or utilize other techniques known in the art.

In processing one or more vehicle data records 112, the assignment manager 126 may at some point create, update or delete a single "master vehicle data record" 136 for a vehicle 110. The master vehicle data record 136 may serve, among other things, as a representation of all data within the system 100 for a vehicle 110 that has been derived by applying filtering logic to its one or more associated vehicle data records 112 in order to determine whether, how, and by which venues 122 some or all of its data, expressed as the values of various fields, may be further utilized.

The master vehicle data record 136 represents a logical concept utilized for ease of comprehension. In the illustrative embodiment described below in reference to FIG. 2, the information contained within the master vehicle data record 136 may be instantiated by one or more vehicle data objects. Along the same lines, alternative embodiments employing other techniques known in the art may instantiate the concept by retaining original and/or filtered versions of each vehicle data record 112 for a vehicle 110 and later using other logic to determine, among other things, whether, how, and by which venues 122 the individual field values from each vehicle data record 112 may be further utilized. A vehicle 110 may be associated with one or more venues 122 to which some or all of its data, arranged as field values within its master vehicle data record 136, may be made available for possible use.

The inventory manager 108 further includes reference datasets 138 that contain standard vehicle labeling, equipment configuration and other data. The inventory manager 108 further includes style data 140 that serves as an internal standard vehicle classification for the system 100.

The system 100 may further include a rules engine 142 to assist in processing vehicle data within the vehicle data record 112. Depending upon specific implementation needs, incorporation of a rules engine 142 may be accomplished by using available third-party software components or through the development of custom software, as is well known in the art. For example, the specification for the Java® Rule Engine Application Programming Interface (API) (JSR 94), developed through the Java® Community Process (JCP) program, defines a Java® runtime API for rule engines by providing a simple API to access a rule engine from a Java® Platform, Standard Edition (Java® SE, formerly known as J2SE) or a Java® Platform, Enterprise Edition (Java® EE, formerly known as J2EE) Java® technology client. Consequently, if the system 100 is implemented as an extension of such a platform, available rules engines, such as Drools™, Fair Isaac Blaze Advisor™, ILOG® JRules, and Jess® that support JSR 94, may be used. The rules engine 142 incorporates rules 144 from rule set 146. Once a vehicle data record 112 is received, the vehicle processing manager 124 may, among other things, activate the rules engine 142 or else activate the manager sub-modules 126, 128, 130, and 132 to process the vehicle data in accordance with their respective roles.

For example, when activated, the assignment manager 126 may at some point activate the rules engine 142, that, in electronic communication with the rule-sets 146, assists the assignment manager 126 in determining which data values from the vehicle data record 112 are to be made available within the master vehicle data record 136 for potential use by one or more of the venues 122 associated with the vehicle 110. As a consequence, some values from a vehicle data record 112 may be blocked from access by a venue 122 that is associated with the vehicle 110.

Similarly, the transformation manager 128 may at some point activate the rules engine 142, in electronic communication with the rule set 146, to determine what modifications to make, if any, of values available for potential use to one or more of the venues 122 within the master vehicle data record 136. Along the same lines, the augmentation manager 132 may at some point activate the rules engine 142 to determine what values, if any, for certain fields, such as types of reference data, not contained in a vehicle data record 112 may be made added to the master vehicle data record 136 for potential use by one or more of the venues 122. In doing so, the augmentation manager 132 may rely upon the output of the style identification manager 130, discussed below.

When activated, the style identification manager 130 may at some point activate the rules engine 142, in electronic communication with the rule set 146, to help determine for a venue 122 the smallest possible subset of granular normal product classes or styles (from amongst one or more system selected internal standard classifications) to which the style identification manager 130 determines the vehicle 110 may correspond, as derived from data within the master vehicle data record 136 that is available to be used on behalf of the venue 122. Upon doing so, the style identification manager 130 may update a master vehicle data record 136 with such styles to enable the vehicle processing manager 124, with the assistance of the augmentation manager 132, to determine the proper set or sets of reference datasets 138 that may be made available to the venue 122 to augment other vehicle 110 information available to the venue 122. The concepts of styles and vehicle data augmentation, as well as the functioning of the style identification manager 130, is explained in more detail below and with reference to FIGS. 5 through 7.

Some or all of the methods used by the vehicle processing manager 124 to filter a vehicle data record 112 may be based on one or more rules 144 that may be utilized by the rules engine 142. A particular filtering method rule 144 may apply to all vehicle data records 112 processed by the vehicle processing manager 124 or apply only to certain vehicle data records 112 as determined, among other things, by the source 114 of the vehicle data record 112 and/or by the venue or venues 122 with which the vehicle data record's 112 corresponding vehicle 110 is associated. Among other things, one or more filtering rules 144, such as those sharing certain common characteristics (for example, rules 144 that are common to one or more sources 112 and/or venues 120), may be conveniently grouped into corresponding rule set 146 for identification, tracking, and other purposes. Among other things, rule set 146 may contain instructions for how some or all of the data values within a vehicle data record 112 may be used to create, read, update and/or delete values of the same or other fields within a master vehicle data record 136 for possible use by one or more venues 122 that are associated with the vehicle 110.

In one embodiment, a rule 144 applicable to a source and/or a venue associated vehicle 110 may, among other things, be applied to its one or more corresponding vehicle data records 112 to read (or access), create, delete, and update a master vehicle data record 136 for the vehicle 110. One or more vehicle data records 112 from one or more sources 114 may be associated with a master vehicle data record 136, which in order to provide data for possible use by a venue 122 (among other things) may be associated with the ones that are associated with its corresponding vehicle 110. A venue 122 may be associated with one or more vehicles 110 and therefore with one or more master vehicle data records 136.

Rule set 146 may place restrictions specific to a source 114 or group of sources 114. One or more rules 144 may be established that govern use of data contained in vehicle data record feeds for venue-identified vehicles 110 from an auto manufacturer (hereinafter "manufacturer") source 114 within a system 100. "Venue-identified" refers to a vehicle 110 being affiliated with one or more known venues 122 to which some or all of its information may be made available for possible use. Rule set 146 may establish filtering methods for the values of particular attribute fields, such as the manufacturer model code (hereinafter, "model code"), model label, trim label, body style type (e.g., coupe, sedan), transmission type, transmission speeds, drivetrain type, vehicle type (e.g., car, truck, sports utility vehicle), number of doors, and manufacturer certification status, within new and/or used vehicle data records 112 from a source 114. In one embodiment, this may mean among other things that although these values are present in the master vehicle data record 136 for a vehicle 110, they may only be available for possible use by a subset of the venues 122 with which the vehicle 110 is associated.

For instance, rule set 146 may establish that the master vehicle data record 136 may make the mileage, model code, drive wheels, and exterior color values provided by a source 114 available for possible use (possibly after other filtering of this data) only by a restricted subset of all venues 122 with which its used vehicle 110 is associated. This subset may consist of only those website venues 122 sponsored either by the manufacturer that is serving as the source 114 or by the dealer franchisees themselves. Consequently, rule set 146 may prohibit a source's 114 values for these fields from possible use by any website venues 122 that are sponsored by other manufacturers of which these dealers may also be franchisees. For those other venues 122 to be potentially able to use data for these fields, the values must derive, if present, from vehicle data records 112 provided by a different source 114, such as the dealership's DMS. If they are not present in an eligible feed, then values for these fields may not be made available for possible use, such as exposing on a Web page or further processing, by these other venues 122.

As an example rule set's restrictions specific to a single venue 122 or group of venues 122, rule set 146 may be specific to a group of manufacturer-sponsored website venues 122, such as those that a manufacturer may sponsor for its dealer franchisees. Rule set 146 may prohibit, among other things, one or more values for fields, within master vehicle data records 136 made available for possible use by that manufacturer's sponsored franchisee website venues 122, from being accessed, created, updated, and deleted by the vehicle data records 112 of a venue-identified vehicle 110 obtained in any feed for which the vehicle manufacturer itself is not the source 114. Similarly, another venue-specific rule set 146, such as that established by an auto dealer sponsoring his own dealership website (i.e., distinct from any manufacturer-sponsored franchisee websites), may among other things prohibit certain master vehicle data record values made available for possible use by that dealer-sponsored website venue 122 from being accessed, created, updated, and deleted from the corresponding vehicle data records 112 for which the source 114 is not the dealership's own DMS.

For instance, the rule set 146 specific to a group of manufacturer-sponsored website venues 122 may, among other things, prohibit the used vehicle values for the mileage, model code, drive wheels, and exterior color code fields made available for possible use by that manufacturer's sponsored franchisee website venues 122 from being created, updated, and deleted by vehicle data records 112 obtained in any feed for which the vehicle 110 manufacturer itself is not the source 114. Similarly, another venue-specific rule set 146 established for an auto dealer's own sponsored dealership website may among other things prohibit a used vehicle master vehicle data record values for drive wheels made available for possible use by that dealer-sponsored website venue 122 from being accessed, created, updated, and deleted from the corresponding vehicle data records 112 for which the source 114 is not the dealership's own DMS. The functional effects of source- and venue-specific rule set 146 are discussed further below in reference to FIG. 4.

As such, in order to support making multiple "versions" of the value for the same attribute of a vehicle 110 available for possible use by different venues 122 with which the vehicle 110 is associated as may be determined by source-based and venue-based filtering rules 144, the master vehicle data record 136 fields for an attribute may be implemented in the form of multiple source-attribute pairs in which the source 114 may vary but the attribute is the same in order to hold multiple data values for it. Various embodiments supporting this capability may be based on different techniques known in the art. In one implementation, each source-attribute pair may be classified as available for possible use by none, some, or all of the venues 122 with which a vehicle 110 is associated. If not modified by custom rules 144, venue-availability routing of data values within a vehicle data record 112 may be based on system 100 default rule set 146 applied to specific sources 114 or groups of sources 114 and/or specific venues 122 or groups of venues 122.

In one embodiment, certain one-time system settings of rules 144 applying to sources 114 and venues 122 may bypass the rules engine 142 and be initialized within the vehicle data manager 124 or the assignment manager 126 via use of a Business Process Execution Language (BEPL) implementation mechanism or otherwise established by techniques known in the art. Groups of sources 114 and venues 122 may be conveniently identified by reference to a mapping table in other data 134 that maps sources 114 and venues 122 to source- or venue-type classes. The default classification may be modified, if need be, by inclusionary and/or exclusionary rules 144 actively established by authorized system 100 users on behalf of the-sources 114 and/or the venues 122 by means of the system configurator 142.

For example, the assignment manager 126 may be established with a default source-availability rule 144 specifying that all vehicle data record current (i.e., after any preliminary filtering) field values from a source 114 may be made available for possible use to all vehicle-associated venues 122. Additionally, a default venue-availability rule 144 may specify that all vehicle data record current field values from all sources 114 may be made available for possible use to a venue 122 associated with the vehicle 110. In this example, exceptions prohibiting a vehicle data record value from a source 114 from being made available to a venue 122, and prohibiting a vehicle data record value for a venue 122 from coming from a source 114, may be determined by active creation of exclusion-based (prohibition) rules 144 as determined by the sources 114 and venues 122, respectively.

Separately, the system 100 may use various methods to enable a venue 122 to determine which of the data available within the master vehicle data record 136 to actually use. Among other things, "actual use" may consist of exposing a data value to an audience of the venue, or further processing the value for some secondary use. For example, actual use may consist of a website venue 122 exposing an available attribute value to consumers visiting it. In one embodiment, the master vehicle data record 136 may be construed as the system proxy or representation of the inventory "object" or actual vehicle 110. In such an implementation, the master vehicle data record 136 may be further processed into one or more "object views" (or "vehicle views") consisting of the information for the vehicle 110 actually accepted for use by a venue 122 as determined by other rules 144 associated with the venue 122. These rules 144 may determine relative precedents of use for different source-attribute pair identified field values for the same attribute that may be available for use by the venue 122. In other embodiments, the data values to actually be used by a venue 122 may be determined by applying filtering mechanisms to the master vehicle data record 136 that apply universally to all venues 122 to which data is furnished by the system 100, by creating a distinct venue-specific vehicle data usage record for each venue 122 associated with a vehicle 110, or by other methods known in the art.

One method includes storing the information about the objects in an accessible database. The information about each object is configured into predetermined convenient subsets, and these subsets may be accessed independently from each other for furnishing to a venue 122. Rules, associated with each venue 122, are used to select subsets of the information about the objects and to provide only the selected subsets to each website venue 122. Rules 144 are used (a) to select appropriate subsets of the information for one or more objects that are permitted to be furnished to a particular venue 122 (the compilation of the subsets into furnished information presents an "object view" to that venue 122); and (b) to aggregate these object views into groups that meet the same object view inclusion/exclusion criteria ("venue views"); and (c) to furnish the selected venue views to one or more venues 122, based on each particular venue's rule. The term "object view" means the information furnished for an object to a particular venue 122, and that information is customized through the use of rules. These rules for creating object views, venue views, and making venue views available to one or more venues 122 may be implemented manually or in a programmed (automated) manner, and may be based on implicit or explicit criteria. Thus, data compilation into subsets and applying rules permits customization of information for each venue 122 and its associated audience(s).

In another aspect, the system 100 provides information about objects to a plurality of venues 122, each having an associated audience(s), wherein certain audiences (and hence venues 122) are only permitted access to certain subsets of information about the objects, and other audiences are allowed access to other subsets of information, although there may be some commonality in the subsets accessed by each audience. In illustrative examples the objects are vehicles. The system 100 includes at least one database wherein information about each object is configured into subsets, and the subsets of information may be accessed independently from each other. Each venue 122 has associated rules, as discussed above and herein, for furnishing specific subsets of information about appropriate objects to the various venues 122 and their respective associated audiences.

Figure 2:
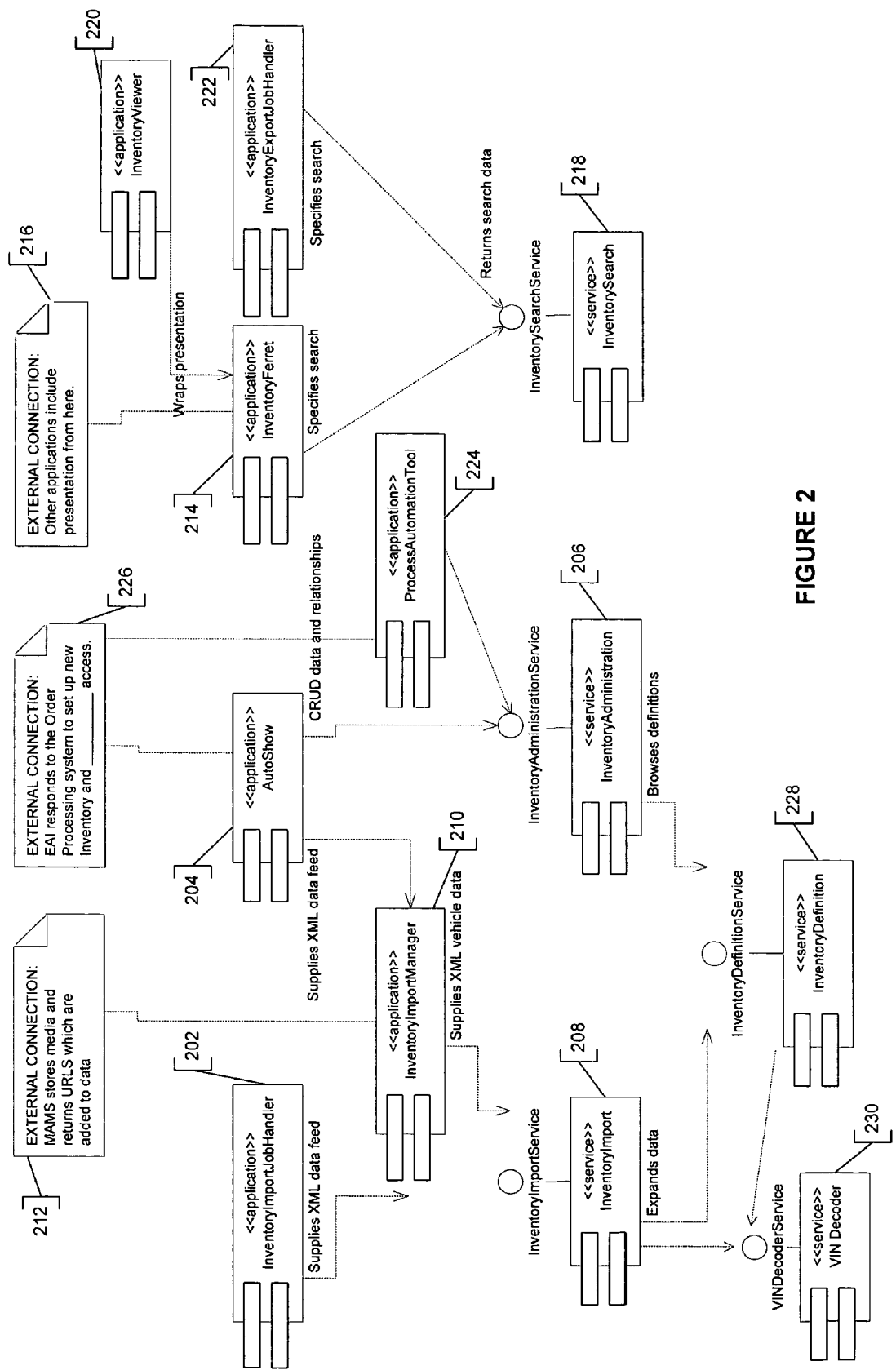
FIG. 2 is a block diagram of a system design overview of an embodiment of a vehicle inventory management system.

Referring to FIG. 2, an application layer 200 comprising various applications that serve the managers discussed in FIG. 1 is shown. The illustrated application layer 200 provides a system overview of applications that may be distributed over a network. The application layer 200 may implement specific business processes, impose order on service calls, and provide a high-level user interface. Each application may be accessible by a universal resource locator (URL), the address of a controller servlet that performs requested actions, often with information passed as request parameters. Among other things, the application layer 200 may include the following major components discussed below.

An Inventory Import Job Handler 202 may incorporate the functions needed to run periodically or on demand and submit import vehicle data record 112 feeds into the system. Its functions may be implemented in the form of Perl scripts and Crontabs, with most data conveniently arriving via a file transfer protocol (FTP) site.

A vehicle data editor (hereinafter, Auto Show) 204 may be a web-based application compliant with a J2EE platform architecture that provides a graphical user interface (GUI) for data management processes through which an entity individual (such as a dealership employee, owner, or other interested party) may, among other things, manually create, read, update, and delete individual vehicle data records 112 for a vehicle 110. The Auto Show 204 may be embodied as the inventory data editor 116 of FIG. 1 and resident at a source 114. The Auto Show 204 may associate various possible venues to which some information about the vehicle data record may potentially be made available by routing through an Inventory Administration Service 206, discussed below. Updates to vehicle data may be routed through an Inventory Import Service 208, described below. Additionally, Auto Show 204 may provide a mechanism for vehicle data records 112 to be batch uploaded into the system 100, such as in the form of a spreadsheet.

An Inventory Import Manager application 210 may function as a pseudo-service, easily interfaced via hypertext transfer protocol (HTTP), that preprocesses certain data within a vehicle data record 110 feed, including moving media within a vehicle data record 110 into a Media Asset Management Service (MAMS) 212 that may also support more general platform media content service needs, to publish the media, and insert the corresponding media URL into a vehicle data file. Among other things, the Inventory Import Manager application 210 may use an Inventory Import Queue Sender object to encapsulate the responsibility for placing import data references onto the queue to which an Inventory Import Service 208 is listening, as discussed below.

The Inventory Import Manager 210 may then pass the feed on to the Inventory Import Service 208, where the rest of the vehicle data record associated vehicle 108 data file processing is undertaken. The Inventory Import Manager 210 may also accept batch data uploads from the Auto Show 204 application, such as uploaded spreadsheets. In performing these functions, the Inventory Import Manager 210 may receive vehicle datasets from a Perl script that detects a vehicle data record 112 import feed's arrival, loads associated media files, and converts the complete dataset into an XML format. This application may then store the XML in a file and put the file path into a message queue.

An Inventory Ferret 214 may provide a partial presentation layer of vehicle data that may be included in certain venues 120, such as websites. Among other things, the Inventory Ferret 214 may return generally useful form elements, search results tables, and drill down detail displays in response to straightforward HTTP requests. This may be useful for website venues that need to integrate with the system 100 while being insulated from the service layer. For example, certain website venues may be hosted by external systems 216 for which a service layer interface to the system 100 is not available. The Inventory Ferret 214 wraps an Inventory Search Service 218, discussed below, with a servlet interface and returns text that contains Javascript and HTML code. All actions executed by an Inventory Ferret Controller Servlet may use an Inventory Ferret Utility utility class (or its subclasses) to perform most of the work required by the action's process. The Inventory Ferret Utility's methods may be static, enabling quick look-up and execution, and, being unaware of any web-based objects, the methods are therefore relatively easier to unit test.

The text returned by the Inventory Ferret 214 may then be suitable for inclusion within a host website's pages to form a complete web-based user interface to the system's 100 inventory search capability. Each request to the Inventory Ferret 214 may contain an identifier for the type of output desired and the hosting venue's 120 system 100 identifier along with any optional configuration and search parameters. The Inventory Ferret 214 may also enable the Auto Show 204 vehicle data editing application to perform many of its search functions such as may be necessary to find vehicle 110 data for updating, etc.

An Inventory Viewer 220 application may provide useful access to the system 100 through complete web pages and also serve as a reference implementation of a user-facing application that wraps the Inventory Ferret 214. This application may be useful for framed-in or stand-alone Web page solutions that present data about a vehicle 110.

An Inventory Export Job Handler 222 application may incorporate the functions needed to run periodically or on demand and conduct data file extractions from the system 100, such as may be exported via FTP. Among other things, its functions may be implemented by means of Perl script and Crontab mechanisms.

A system Process Automation Tool (or "PAT") 224, which is an administrative application, may be employed to allow a privileged system 100 user to create, delete, and relate venues 122, groups or "inventories" of certain vehicles 108, sets or "collections" of vehicles 110 whose information may be made available to the same venue 122, and sources 114. In doing so PAT 224 may be connected to external systems 226, such as to business order processing systems via enterprise application integration (EAI) capabilities, in order to access various inventory set-up information, venue 122 associations, and related instructions, among other things.

The application layer 200 may comprise various services that encapsulate object-oriented transactions, exposing methods that are defined by reusable, discrete business operations. These services may be useful for applications as well as for other broader platform service components needing a finer-grained control over the use of the system 100.

Among them, the Inventory Import Service 208 may transactionally translate feeds of vehicle data records 112 into persistent information about vehicles 110 for venues 122. The rules engine 142 supports the functioning of the Inventory Import Service 208 to identify the appropriate logic and sequence by which to filter data for a vehicle 110. Some of the Inventory Import Service's 208 specific responsibilities may include queuing data feeds to balance loads over time and observing vehicle data record 112, data element processing, and precedence rules (such as when multiple vehicle data records 112 for the same vehicle 110 come from the same source 114). Additionally, the Inventory Import Service 208 may assign, transform, enhance, augment and standardize vehicle data so that, among other things, the vehicle data may be saved in a format that is optimized for quick, simple, and user-friendly searches. The Inventory Import Service 208 further routes individual vehicles 110 into appropriate collections of vehicles 110 whose information may be accessed by the same venues 122, and publish the data for use. The rules engine 142 may support the Inventory Import Service 208 and the Inventory Definition Service 228 by identifying the appropriate logic and sequence by which to filter data for a vehicle 110.

In doing so, the Inventory Import Service 208 provides write access to vehicle data. The Inventory Import Service 208 may begin by taking a reference to a (XML) file that contains all of the import information and placing the file reference in a Java Message Service (JMS) message queue. A message driven bean, Inventory Import Message EJB, listens for messages at a queue location (such as "com.cobaltgroup.jms.InventoryImportQueue"), responds to a detected message by reading the XML file referred to by the file path written within the message, and then converts the file contents into an object called an Inventory Import Feed object which the message driven bean sends on to the service's controlling program, such as a Master Control Program. Among other things, the Inventory Import Feed object includes the data and mappings needed to route the data import for the vehicle data record 112 based on the source 114 and the vehicle associated venue 122. This message driven bean's file descriptor controls the pool of these components and therefore may control the efficiency of queue usage and persistence layer access.

Upon receipt of the vehicle data record 112 data contained within the Inventory Import Feed object, the Inventory Import Service Master Control Program controls the flow of this data through the service's various processing steps. In doing so the Master Control Program may, among other things, use various utility objects to operate on the data according to certain business rules, employ a rules engine for certain processing steps, and guide use of a contributory Inventory Definition Service 228 (discussed below), and a contributory VinDecoder Web Service 230 before satisfying its responsibility to persist this processed data in a database within memory 106 via a particular bean—Import Vehicle Inventory EJB—that supports this step. This component provides service-level access to the persistence layer via a Data Access Object (DAO). Transactions are controlled as Declarative Transactions, and the container uses this bean for transactional, atomic database operations. The component's Inventory Import DAO encapsulates database operations that alter the database records. The Inventory Import DAO uses SQL statements that reside in a property file for the Inventory Import Service 208 deployable package. Among other things, data processing stages and functional outputs of the Inventory Import Service 208 are discussed in greater detail with reference to FIG. 4 below.

In the illustrative embodiment a VinDecoder Web Service 230 may support both the Inventory Import Service 208 and the Inventory Definition Service 228 by providing some of the vehicle data that may be derived from its Vehicle Identification Number (VIN). The VindDecoder Web Service 230 may do so by decoding the data encapsulated by certain of the VIN characters, such as its year, make, and model, among other things. Commonly, VIN decoding programs may be provided by third-party vendors, such as R. L. Polk & Co., which offers this software functionality commercially as a product whose native code is written in the C programming language. If desired to prevent widespread Java Virtual Machine (JVM) crashing, a C-language software application may be isolated away from the inventory management system application servers by wrapping the function with a Web service running on another machine and deploying it separately from the other services that rely upon it.

An Inventory Definition Service 228 may, among other things, provide the Inventory Import Service 208 with mappings to proper sets of reference data that may be used to standardize and augment data about an actual vehicle 110 obtained from within a vehicle data record 112. The Inventory Definition Service 228 does so by associating the one or more system vehicle data objects with an appropriate idealized vehicle or "style" from within the style data 140. The rules engine 142 may be incorporated within the system 100 to support the Inventory Definition Service 228 to help identify the appropriate logic and sequence by which to filter data for a vehicle 110. Depending upon implementation needs influenced, among other things, by business drivers, this service may associate the one or more system vehicle data objects with an appropriate idealized vehicle or "style" from within multiple internal idealized vehicle classifications that may serve as internal standards for the system 100.

The service receives an array of vehicle objects and logically associates each object with a smallest possible set of idealized vehicles, from within each of the one or more internal standard idealized vehicle classifications, to which the service determines the closest match using a series of specially designed logic steps that take into account various data in the object, some of which may reflect the output of the VinDecoder Service 230. Tables within the style data 140 may then be accessed to obtain the mappings or keys that associate these smallest possible sets of idealized vehicles to the one or more corresponding reference datasets 138 that contain standard vehicle labeling, equipment configuration and other data. The system 100 may then use this information to standardize and augment vehicle information, among other things. Certain data processing functions of this service are described in greater detail below.

Although in the illustrative embodiment, both the VinDecoder 230 and Inventory Definition 228 applications exist primarily to serve the Inventory Import Service 208 of the system 100, they are also usable by external entities and therefore may be exposed as services architecturally.

Additionally, the Inventory Administration Service 206 may provide direct control of the content, lifecycle, and relationships within the system 100 and therefore provide support for system 100 administration applications, such as PAT 224. This service provides creation, update, and delete access to persistent domain objects representing, among other things, vehicles 110, inventories of vehicles 110, collections of vehicles 110 whose data may be accessed by the same venue 122, venues 122, and sources 114. In doing so, the Inventory Administration Service 206 may allow for the management of specific vehicles 110, inventories, venue data, and the relationships between them, enabling applications that subscribe to this service to manage the lifecycles of various domain objects within the system 100.

An Inventory Search Service 218 may provide a fundamental service for the system 100 by allowing a variety of applications to search and browse the inventory data through read-only access to it. A minimal requirement is that a system venue identifier be provided with every query. The system venue identifier is mapped to one or more conveniently established collections of vehicles 110 associated with (or "subscribed to") the venue 122, enabling the query to then select from the vehicle data made available to the venue 122 for vehicles 110 contained within the collection. Query criteria are supplied by an Inventory Search Specification that wraps the venue identifier and other allowable search parameters. Results may be returned as Vehicle Summaries. Additionally, the service provides a list of Searchable Vehicle objects that capsulizes the description and count of vehicles 110 that can be found for a given destination identifier. This is designed to assist applications that structure the search options available to a user. One example of a search option structure is drop-down boxes in search forms.

From the perspective of the J2EE network platform's component layer, each service is backed by a buildable, deployable package. In order to reuse overlapping functions, the Inventory Definition 228 may be used as a standalone service but may also be made available to the Inventory Import 208 and Inventory Administration 206 services' components. Applications may also be separately deployable components.

A persistence layer, including memory 106, may be common to all of the components in the system 100. This layer may be tasked with remembering over long time periods information, such as snapshots of previous vehicle data record feeds (to detect the applicability of updated data), import process status, vehicle inventory and venue relationships, rules, reference datasets 122, and vehicle data.

Some of the application and service functions discussed above in reference to inventory manager 108, such as the Inventory Import Service 208 and Inventory Definition Service 228 may be represented as supported by a functional element (or module) of the inventory manager 108 referred to above as the vehicle processing manager 124.

Figure 3:
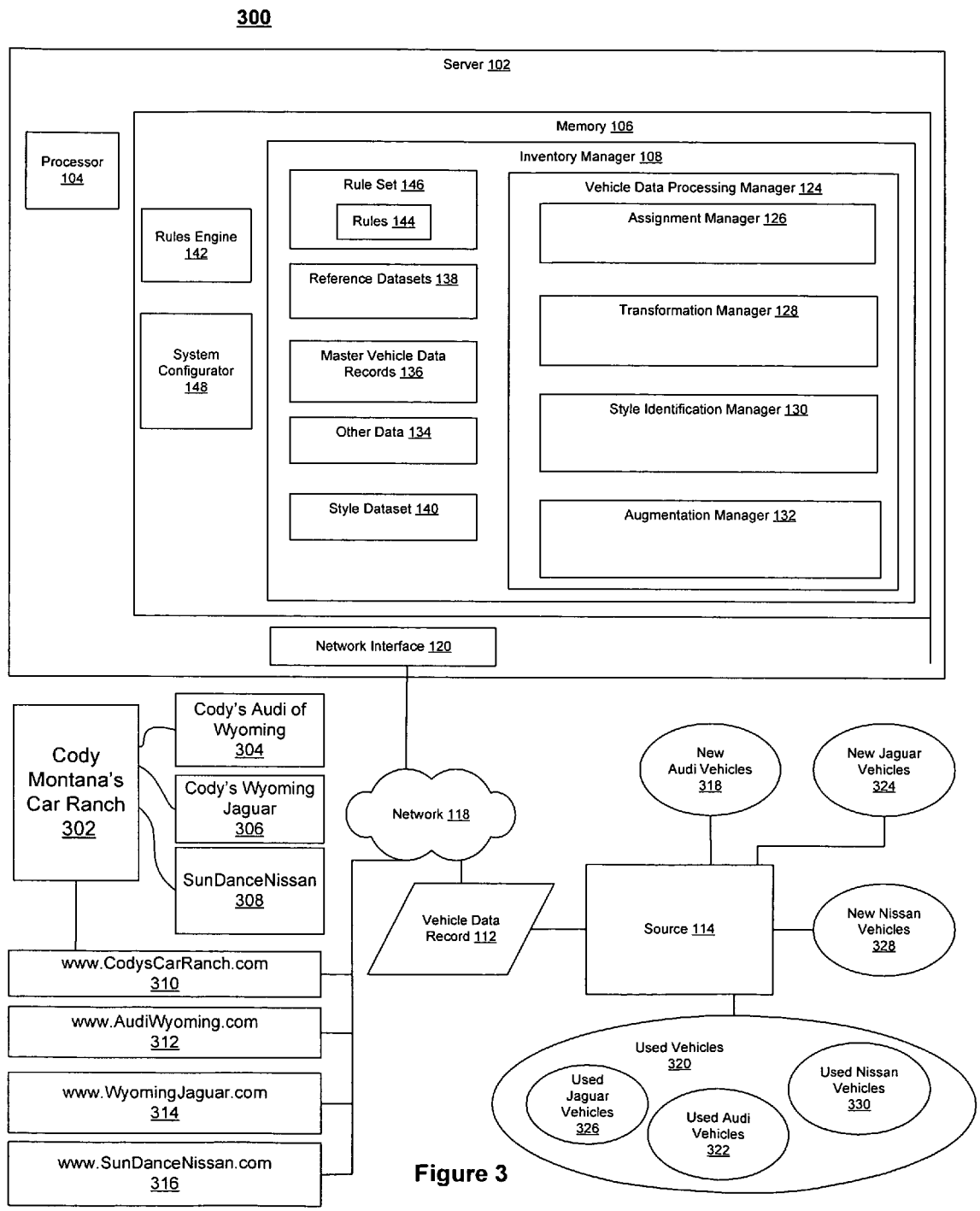
FIG. 3 is a block diagram of an inventory data and processing system involving automotive passenger vehicles of a specific dealership.

Referring to FIG. 3, a block diagram is shown of an exemplary system 300 that illustrates vehicles, venues, and sponsors in an automotive vehicle retailing domain. Auto dealer Cody Montana owns the large "Cody Montana's Car Ranch" auto dealership 302 in SunDance, Wyoming, where Cody's three automotive passenger vehicle franchises are located: an Audi franchise (the "Audi of Wyoming" store), a Jaguar franchise (the "Wyoming Jaguar" store), and a Nissan franchise (the "SunDanceNissan" store). Each of these three stores may sponsor a website which serves as a venue 304, 306, 308. Additionally, Cody Montana's Car Ranch sponsors its own independent website venue 310 ("www.CodysCarRanch.com") for the entire Cody Montana's Car Ranch dealership.

Furthermore, Audi of America sponsors a website venue 312 ("www.AudiWyoming.com") for Cody's Audi franchise, Jaguar North America sponsors a website venue 314 ("www.WyomingJaguar.com") for Cody's Jaguar franchise, and Nissan North America-sponsors a website venue 316 ("www.SunDanceNissan.com") for Cody's Nissan franchise. www.AudiWyoming.com 312 markets Cody's new Audi vehicles 318 and all used vehicles 320, including used Audi vehicles 322. www.WyomingJaguar.com 314 markets Cody's new Jaguar vehicles 324 and used Jaguar vehicles 326 only. www.SunDanceNissan.com 316 markets Cody's new Nissan vehicles 328 and all of Cody's used vehicles 320, including used Nissan vehicles 330. www.CodysCarRanch.com 310 markets all of the dealership's franchised new vehicle brands, Audi, Jaguar, and Nissan, 318, 324, 328 as well as all of the dealership's used vehicles 320. Although, for example, the same new Jaguar vehicle 108 may be marketed on both the manufacturer-sponsored "www.WyomingJaguar.com" website venue 120 and Cody's own dealership-sponsored "www.CodysCarRanch.com" website venue 120, a field value from one or more of its vehicle data records 110 may be appropriate for the Jaguar website venue 120 but not for the Cody's Car Ranch website venue 120.

Referring to FIG. 4, a chart 400 illustrates the concept of source and venue based rules 144 to determine venue data availability for the venues of FIG. 3. FIG. 4 shows how rules 144 associated with determinants may affect which field values from vehicle data records 112 for a vehicle 110 may be made available within a master vehicle data record 136. The operation of source and venue determined vehicle data record filtering rules 144 is illustrated using the dealership example of FIG. 3. Audi of America may arrange for the system 100 to process new and used vehicle data records 112 provided by the Audi of America corporate database that encompasses Audi vehicles 318, 322. As such, Audi of America is a potential source 114 to the system 100 of vehicle data records 112 pertaining to Cody Montana's new and used Audi vehicles 318, 322. In addition, all of the Audi of America-sponsored, Jaguar North America-sponsored and Nissan North America-sponsored franchisee website venues 312, 314, 316, as well as Cody Montana's independently sponsored website venue 310, may access data made available to them by the vehicle processing manager 118.

Illustrating source-determined rules 144, all Audi-sourced used vehicle data record values 402, including those for mileage, model code, drive wheels, and exterior color fields (e.g., fields "a"-"d" in Figure C), may be permitted by a default rule set 404 to be made available within Cody's used vehicle master vehicle data records 134 for possible use by all venues associated with all of Cody's used vehicles 320, which in this example includes www.AudiWyoming.com 312, www.CodysCarRanch.com 310, and www.SunDanceNissan.com 316.

However, special (or custom) exclusion rules 406 may be created that override the default rule set 404 by prohibiting all Audi-sourced vehicle data record values 408 from being made available to venues that are sponsored by other manufacturers, such as www.SundanceNissan.com 316 for Cody's Nissan franchise. The exclusion rules 406 may further prohibit the model code value 410 (but allowing all other values) within those vehicle data records 112 from being made available to www.CodysCarRanch.com 310. As can be seen in FIG. 4, these vehicle data record values 408, 410 have become null with the application of these source-based data value availability rules 406.

Therefore, if vehicle data records 112 for a Cody's used Audi vehicle 322 from all other sources, such as Cody's DMS contain, for example, null model code field values 412, model code information 414 about Cody's used Audi vehicle 322 may become available for possible use by www.AudiWyoming.com 312 but not by www.CodysCarRanch.com 310 and www.SundanceNissan.com 316. As can be seen in FIG. 4, the values 412 for this field within the vehicle data record 110 is null with the application of these source-based data value availability rules 406, and therefore a non-null value 416, 418 for this field is not available for possible use by either the www.CodysCarRanch.com 310 and www.SundanceNissan.com 316.

Rule set 420 specific to and determined by a venue or group of venues may also be illustrated in the example of FIG. 4. Cody Montana's Car Ranch 302 may have also arranged with the system 100 for the system 100 to process vehicle data records 112 captured from the dealership's DMS in order to make the values for all fields within the vehicle data records 112 of the dealership's corresponding used vehicle inventory available, without modifying 406 the default rule set 404, for possible use in all venues associated with the Cody Montana Car Ranch dealership's used vehicles 320. As such, this would include the www.AudiWyoming.com 312. However, Audi of America may establish a rule set 420 specific to all of its sponsored franchisee website venues. This rule set 420 may prohibit vehicle data record values obtained from sources 114 other than the Audi of America-source to be made available within used Audi vehicle master vehicle data records 136 for possible use by venues, including www.AudiWyoming.com 312. Hence, even though Cody's dealership 302 is willing to make its DMS source values available to www.AudiWyoming 312, Audi's venue-determined rule set 420 prohibits the master vehicle data record 136 from making these values available to it for possible use.

Therefore, if for some reason the Audi-sourced used vehicle data records for Cody's used vehicles 322 do not contain mileage values 422, the Audi of America-sponsored www.AudiWyoming.com 312 may not be able to make use of this information 424, 426. This is even though Cody's DMS-sourced vehicle data record 428 contains the mileage value 430 and Cody's DMS source non-overridden default rule set 406 permits use of the value 432 by the Audi of America-sponsored venue. On the other hand, if the other two website venues associated with Cody's used vehicles 320 (www.CodysCarRanch.com 310 and www.SundanceNissan.com 316) permit 420 use of mileage values obtained from Cody's DMS source 114, then the other non-Audi-sponsored venues may end up with more comprehensive mileage information about Cody's used Audi vehicles 322 than the Audi of America-sponsored venue www.AudiWyoming.com 312 because the master vehicle data record 136 contains mileage information 434, 436 available for use.

Further, although the rule set 420 for the Audi-sponsored venue may be as stated above, and the rule set 406 for the Audi database source may permit Cody's dealership website venue 310 to access all field values in its vehicle data records, the rules 406 for the Cody's DMS-source may restrict potential use of master vehicle data record values derived from vehicle data records contained in its feeds to Cody's own sponsored www.CodysCarRanch.com 310, and the rules 420 for that venue may limit it to possible use of master vehicle data record values only derived from the Cody's DMS-source. Consequently if, for example, drive wheels values (e.g., front-wheel drive, all-wheel drive) 438, 440 are present in both the Audi-sourced and the Cody's DMS-sourced vehicle data records 402, 428 for a vehicle but the two values differ, that same vehicle's drive wheels value, and hence possibly any information later derived from it, may end up being different in the www.AudiWyoming.com 312 and www.CodysCarRanch.com 310. Cody's Car Ranch website 310 may choose to prohibit this particular field value within vehicle data records 402 provided by the Audi source from being made available to the venue 310 within the master vehicle data record 136.

As noted, among other things rule set 404, 406 may contain source-and/or venue-associated instructions for transforming an available field value within a master vehicle data record 136. Continuing with the example above, the same values for the exterior color field 444, 446 may be available in the vehicle data records 402, 408 from the Audi source and the Cody's DMS source. While the venue-availability rules 420 of www.AudiWyoming.com 312 and www.CodysCarRanch.com 310 permit these values 448, 450 from their respective sources to be made available to them within the master vehicle data record 136, Cody's dealership-sponsored venue 310 establishes a transformation rule 452 that may direct the master vehicle data record 136 to populate this field for this venue 310 with a value 454 within a transformation look-up table in other data 134 that is mapped to the vehicle data record's exterior color value 454.

For instance, both the Audi source and the Cody's DMS source may provide manufacturer color name value (e.g., "Dolphin Gray Metallic"), but Cody may prefer to make this field available to www.CodysCarRanch.com 310 with the value substituted by the less pretentious text of "gray metallic" that has been mapped to it within the mapping table in other data 134. Insofar as the Nissan-sponsored www.SundanceNissan.com 316 does not employ a transformation rule 452 for this field, the exterior color value 456 available to it for possible use remains that with which it was supplied from the Cody's DMS source.

Among other things, rules 458 employed by the augmentation manager 132 may enable use of the available master vehicle data record field values, among other things, to derive the venue-available values to insert in a field whose values were not present in a vehicle data record (hereinafter, "new field"). Field value derivation may, for example, involve applying logic and/or table look-ups to one or more existing field values within a vehicle data record in order to derive the value with which to populate the new field. Continuing with the example, a rule-set 458 associated with www.SundanceNissan.com 316 may guide the augmentation manager 132 to access the value in a "mileage assessment" mapping table within other data 134 that corresponds to the joint values of the vehicle year (not shown in FIG. 4) and the mileage field 460 available to it within the master vehicle data record 136 and to populate a new field 462 with the mapped value. For instance, such a mileage assessment mapping table may contain values reflecting empirically-based vehicle mileage classifications such as "low," "medium," and "high" mileage. Another example may involve populating a new "vehicle style" field to be available to a venue that may be derived from other field values within the master vehicle data record 136, such as the year, make, manufacturer model code, and drive wheels fields.

From the forgoing it may be evident that one or more of the vehicle processing manager's filtering methods may be based on rule set 146 associated with one or more venues 122 and/or sources 114 that instruct the filtering of source-identified vehicle data records 112 of venue identified vehicles 110. In order to identify the proper filtering rule set 146 appropriate to the vehicle data record 112, the rules engine 142 may need to identify the source 114 of the vehicle data record 112 and/or the venue 122 associated with the corresponding vehicle 110.

Methods for automatically identifying the source 114 of a vehicle data record 112 that arrives in an automated data feed or is otherwise captured by the system 100 are well known in the art. For example, the source information may be made available to the rules engine 142 from meta-data within the vehicle data record 112 itself. Insofar as the vehicle data record 112 contains vehicle identifying information, the rules engine 142 may obtain the venue information by accessing a vehicle-to-venue mapping table in other data 134, such as may be populated from lists of venues 122 that are authorized by an owner of a vehicle 110 to receive vehicle information. The rules engine 142 may then identify the one or more filtering rule set 146 to apply to the vehicle data record 112 by applying its associated source 114 and/or venue information to a source-and-venue rule set mapping table in other data 134, such as may include rule set 146 that are associated with some combination of one or more sources 114 and one or more venues 122 as described above.

Depending on particular implementation needs, a system 100 default or "placeholder" venue 122 may be created with which all vehicles 110 corresponding to vehicle data records 112 entering the system 100 are automatically associated and which may be internal to the system 100 itself. Such an embodiment may enable the system 100 to begin processing vehicle data records 112 in accordance with any filtering rules 144 or rule set 146 that may apply to all vehicle data records 112 from a source 114 regardless of their associated venues 122 if a vehicle data record 112 is received before its corresponding vehicle 110 has been mapped to its associated venues 122. Doing so may enable some or all filtering to be driven via a rules-based mechanism yet enables the filter processing to be conducted in a practical manner that is less dependent on the serial completion of certain preliminary steps and that optimizes system 100 performance and scalability, among other things.

In addition to capturing from other systems (such as that of a source 114) and then for example assigning or transforming data (such as contained in a vehicle data record 112) that help to identify and provide information about each unique product instance (such as an individual vehicle 110), many inventory management systems attempt to augment these often limited product data with richer information about the product instance that may be of interest to individuals or entities that are shopping for the product, among other things. Commonly, such systems contain one or more tables comprised of data representing the values of attributes (or "reference" data) usually shared by all instances of a product class, such as detailed lists of features, equipment, and specifications. These tables may be accessed to augment available information about each instance of the product class, serving in a sense as the components of a reference library within the system. Associating the proper data from the reference data tables with a product instance may be guided by the system's business logic.

In order for such systems to augment product information captured with a product instance with highly specific, valid, and comprehensive reference information, the systems may rely upon identifying the smallest relevant set of the product classes to which the product instance may belong. Commonly, the classification of the most granular normal or standard "idealized" abstract product classes employed by the product creator or manufacturer itself (or "manufacturer standard product class") attains the status of a de facto product classification standard that may serve as the exact template, or more general basis, by which various third parties offering complementary goods and services subdivide, organize and map their sets of information ("reference data sets") pertaining to the overall product type. As such, in these third party classifications, the smallest standard product reference classes or units (hereinafter, "third party reference units" or "reference units") may often be identical to, or bear an identified relationship to, the manufacturer standard product class and each other.

However, for various reasons, different classification schemas of the abstract or idealized product classes created by one or more non-manufacturer third parties to organize their reference units may better serve as the standard exact template, or more general basis, by which other parties may organize and map their information sets. Consequently, an inventory system may select one or more of these product classifications to implement as an internal standard to which various other sets of product reference data may be mapped for different purposes. As such, the discussion below that focuses on manufacturer-based classifications of standard idealized product classes, including their use as a standard or "master key" to which various third party reference units may be mapped, may also apply to third-party based product classifications selected as an inventory system standard. An inventory system may use product classifications of either or both types as internal standards upon which mapping of product instances to sets of relevant information is based, depending upon various drivers of the system implementation.

Manufacturer standard idealized product classes and third party reference units are often identified by their own text labels or codes (hereinafter, "identifiers") that may be used by an inventory system as virtual keys to the corresponding sets of information that may be stored therein. In many cases, the relationships between the identifiers for the most granular classes (manufacturer standard product classes and third party reference units) of the different reference data set classification systems are known or mapped. For example, a third party reference unit that corresponds to one and only one manufacturer standard product class may natively re-use that classification system's identifier as its own. Alternatively, a third party reference unit may use a different identifier of its own that is mapped to its corresponding one or more manufacturer standard product class identifiers. Further, the third party reference unit identifier may be supplemented by another identifier (for example, by overloading a field, or associating the supplemental identifier with the reference unit identifier through business logic) that serves to distinguish the particular reference attribute, such as weight in pounds or photo angle, whose value may be associated with one or more manufacturer standard product classes.

Commonly, a system may designate the identifier set of one classification system as the standard internal identifier set to be associated with product instances, and map the other identifier sets to this designated system standard, or create its own standard set of identifiers corresponding to some classification of product classes and map the other identifier sets to it. Alternatively, a system may not attempt to establish an internal standard for use as the master key to its reference data sets and instead simply rely upon identifying for each product instance the corresponding manufacturer standard product class and/or third party reference unit identifier for each reference data set that it wishes to utilize for that product instance.

In any event, assigning one or more of these identifier "keys" to an actual product instance enables a system to designate the corresponding class within which the instance falls within each respective classification and to associate its reference information with the product instance. Therefore, for example, determining the particular identifier or identifiers to associate with a vehicle 110 product instance represents a step in enabling an inventory system, such as the system 100, to provide further value by augmenting the information initially derived from a vehicle data record 112 from a source 114. However, determining a product instance's appropriate reference data set manufacturer standard product class or reference unit identifier may be very difficult when it is not provided by the source of the product instance data.

The automotive industry commonly faces these challenges. Passenger vehicle manufacturers (e.g., Honda of America) tend to group their products into hierarchical tree structures for each model year (e.g., 2006) in which the top branch (root node) consists of the brand or "make" (e.g., Honda), followed by internal nodes, such as nameplate (e.g., Civic), then model (e.g., Civic Sedan), and then possibly trim (e.g., EX) and finally by the leaf node or (smallest) standard (normal) product class, sometimes referred to as "base trim" or, hereinafter, "style" (e.g., 2006 Honda Civic Sedan EX with Automatic Transmission and Satellite-Linked Navigation System), each of which has a corresponding base manufacturer suggested retail price (MSRP). In other words, as used here the "style" is the most granular class within the taxonomy and, in these examples, designates the automotive passenger vehicle manufacturers' standard product class within their classification systems. Depending upon the particular manufacturer classification system, a textual label (such as the sample label in the above example) and/or a "manufacturer model code" value (e.g., FA1686KW for the current sample vehicle style) may serve as its identifier.

Vehicles of the same style may differ in terms of certain features, such as colors (e.g., Royal Blue Pearl with Gray interior), equipment versions (e.g., upgraded leather-covered steering wheel), and optional equipment (e.g., side spoiler or fog lights). However, rather than the product hierarchy noting a distinct subclass for each of the many possible style/feature permutations, these permutations are commonly construed as customized versions of the vehicle that are identified by a combination of the style identifier code and codes representing the specific feature choices either as individual options or combined in options packages with pricing established by summing the style's base MSRP and the applicable MSRPs of the various customizations. For instance, continuing with the above example, a particular Honda vehicle may be identified as style FA1686KW with the color PT, equipment upgrade LSWC, and options SS and FL.

Due in part to the fact that passenger vehicles are expensive consumer items about which many different kinds of information from manufacturer and non-manufacturer sources may be valued during the shopping process, such as may occur on various venues 122, a variety of companies in the automotive industry offer different kinds of reference datasets 138 about different passenger vehicle product lines. For example, reference datasets 138 may be available for pricing information, trade-in valuations, available optional manufacturer and aftermarket equipment, safety ratings, reliability ratings, photos, reviews, etc. These reference data set providers' reference units may mirror, or otherwise be mapped to, a given manufacturer's classification of its different vehicle styles.

Third party automotive reference data set and reference unit classifications often mirror manufacturers' classifications of their different vehicle styles. However, rather than re-use a manufacturer's vehicle style identifier label or code (hereinafter, manufacturer style identifier) as its corresponding reference unit's identifier label or code, a third party reference data provider may create a set of proprietary reference unit identifiers and map it to the manufacturer's set of style identifiers. As such, in order for an automotive inventory management system to be able to associate, for possible use by a venue 122, a particular vehicle instance with its corresponding reference unit within one or more reference datasets 138 for which mappings between sets of manufacturer style identifiers and one or more sets of third party reference unit identifiers are available, it must either receive the vehicle style identifier value within a vehicle data record 112 (such as a manufacturer invoice) from a source 114 eligible to provide data for that venue 122, or be capable of deriving the vehicle style identifier value based on other available venue—eligible data within the vehicle's master vehicle data record 136.

Quite often, none of the vehicle data records 112 for a vehicle 110 contain the manufacturer style identifier value, but at least some contain textual or coded information identifying the vehicle's year, make, nameplate and model, and possibly even some other elements, that may constitute part or all of the text label uniquely associated with (i.e., serving as an identifier of) a single style. Continuing with the previously cited example, a uniquely identified (such as via the Vehicle Identification Number, or VIN) instance of the vehicle 110 noted above may be present in a DMS, with the year (2006), make (Honda), and nameplate (Civic). Such information, in fact, may be generally available.

Further, such DMS-based data may include other vehicle attribute information that may be used to create a one-to-one or exclusive match with a vehicle instance's actual or true style, such as trim, body style and transmission type. For example, a vehicle data record 112 captured for the example vehicle instance may also contain field values indicating that it is a sedan with the "EX" trim level, an automatic transmission and a manufacturer-supplied navigation system. Collectively, all of this information may be harnessed to permit an inventory system, such as the system 100, to identify the vehicle instance as matching all of the necessary and sufficient elements that uniquely characterize the "2006 Honda Civic Sedan EX with Automatic Transmission and Satellite-Linked Navigation System" style, and therefore associate it with the corresponding manufacturer style identifier code (FA1686KW) to which various reference data set reference unit identifiers may be mapped.

Unique defining elements necessary and sufficient to directly establish an exclusive (or "exact") match with its manufacturer standard product class may not exist or be known about (available for or associated with) a given product instance. However, in cases in which the presence of one or more product attribute values, or combinations of values, is restricted to only a subset of all possible standard product classes, this other (non-uniquely or "inexactly" identifying) information about a product instance may, through a process of elimination, be used to narrow down the number of manufacturer standard product classes with which it may be associated to a subset of all of its potential classes, possibly even to a subset consisting of a single manufacturer standard product class. Such product attributes that are not uniquely associated with a single manufacturer standard product class, but alone or in combination may incrementally narrow the list of potential classes within which the product may fall, are hereinafter referred to as "product class indicators" or "indicators."

Narrowing down the list of possible manufacturer standard product classes within which a given product instance may belong, even if only to a subset containing multiple classes, may be very helpful in many circumstances. For example, being able to expose for a product instance reference data associated with the reference units corresponding to a smaller subset of manufacturer standard product classes may provide substantial value by limiting the range of reference data values potentially characterizing that instance. Therefore, although challenging to accomplish, exploiting the relationships between a product instance's known values for indicator attributes and the subsets of potential manufacturer standard product classes with which the indicator values may be associated may be a very desirable feature of an inventory management system.

In the automotive passenger vehicle industry, even if one or more definitive indicator attributes exist, the definitively defining attribute value or values necessary and sufficient to directly establish an exclusive match with the true style may not be known about (available for or associated with) a particular unique vehicle. However, in many cases another known attribute value of a vehicle (such as the presence of certain key equipment items), or combination of such attribute values, may be restricted to only a subset of all possible styles for that vehicle's make or model. In these cases, a process of elimination using these known values of a vehicle may narrow down the list of possible styles to which it corresponds to a smaller subset, possibly even a single style. Narrowing down the list of a vehicle's possible styles may provide value by permitting certain reference data subsets common to all of the styles on that list to be associated with the vehicle and, for example, their values to be exposed to consumers. For example, limiting a given vehicle to a specific trim level may enable a system to reveal a great deal of accurate and distinguishing information about amenities and other features present in the vehicle.

For instance, continuing with the specific vehicle example above, an inventory management system may contain information about a vehicle's year (2006), make (Honda), model (Civic Sedan) but not have manufacturer model code information that may automatically associate it with a unique style. By obtaining information about the vehicle's trim level (EX), this particular vehicle's style may then be narrowed down from being one of the eight possible styles (or base trims) associated with the 2006 Honda Civic Sedan model to one of four possible styles: the 2006 Honda Civic Sedan EX with Manual Transmission (FA1586JW), the 2006 Honda Civic Sedan EX with Manual Transmission and Satellite-Linked Navigation System (FA1586KW), the 2006 Honda Civic Sedan EX with Automatic Transmission (FA1686JW), and the 2006 Honda Civic Sedan EX with Automatic Transmission and Satellite-Linked Navigation System (FA1686KW). Narrowing down a particular actual vehicle's possible style to being an unknown one of the four "EX" trim-level styles may permit valid access to subsets of reference data associated with those styles, indicating that regardless of which of the four styles within which it falls, the vehicle has 4-wheel disc brakes, a one-touch power moonroof, and a remote entry system with trunk release, among other things. This is equipment which is available for all styles associated with the "EX" trim class but not available for any styles associated with any other trims.

Further, even in the absence of knowledge of the vehicle's transmission type and presence of a satellite-linked navigation system, certain vehicle options may be available for only one of these four styles, and if the system contains data that the vehicle is in fact equipped with one of these hypothetical single-style-only (or single style limited) options, the vehicle may be uniquely associated with a single style. For example, only the style corresponding to model code FA1686KW (2006 Honda Civic Sedan EX with Automatic Transmission and Satellite-Linked Navigation System) may offer a hypothetical optional manufacturer "heads-up display." If the system receives data that the actual vehicle in question has that particular style-restricted equipment option, it may then be uniquely associated with that particular style or product class, thereby permitting further inferences as to the vehicle's transmission type and satellite-linked navigation system status, among other things.

A vehicle data processing manager's assignment manager 126 sub-module may process and assign data from each vehicle data record 112 for a vehicle 110 in accordance with the rule set 146 that correspond to the record's source 114 and the venues 122 associated with the vehicle 110, and its transformation manager 128 may transform data available to those venues 122 within the master vehicle data record 136 of the vehicle 110 in accordance with a rule set 146 corresponding to and appropriate for the venue 122. Upon, among other things, the creation, modification, or deletion of certain fields' values available for potential use by a venue 122 within the master vehicle data record 136 as per above, the vehicle data processing manager 124 may then instruct the style identification manager 130 to attempt to determine the vehicle style value for the venue 122, based on the data currently available for possible use by the venue 122 and on instructions and logic within a rule set 146 corresponding to the venue 122. The functioning of the style identification manager 130 is discussed in greater detail immediately below with reference to FIGS. 5-9.

In accordance with a corresponding rule set 146, the augmentation manager 132 may then make this style value available for possible use by the venue 122 within the master vehicle data record 136 for the vehicle 110. Further, the augmentation manager 132 may use this style value to determine the corresponding reference unit by means of a style-to-reference unit mapping table in style data 140, and thereby make certain reference unit mapped attribute values, such as may be contained in a reference dataset 138, available for possible use by the venue 122.

In general, the type and order of processes used for manufacturer standard product class identification (style identification, in the illustrative embodiment for the automotive passenger vehicle domain) for a given type of product may be determined by, among other things, the nature of the product classification structure, the classification's relationship with the reference unit classification, and the product class indicators (indirect identifiers) that may be present in some or all of the product instance data records. For example, the structure and degree of granularity of both the manufacturer standard product and reference unit classifications, the accuracy and product coverage breadth of the various sets of reference data themselves, the indicators' degree of presence within the product instance data records, and the indicators' strength of association with the standard product classes may all play a role in determining, among other things, the logic, sequence, and nature of data employed by a manufacturer standard product class identification process. Those skilled in the art will be aware of the fact that familiarity with both the classification data and typical instance data in the relevant product domain is integral to effective design of such reference unit identification processes.

Figure 5:
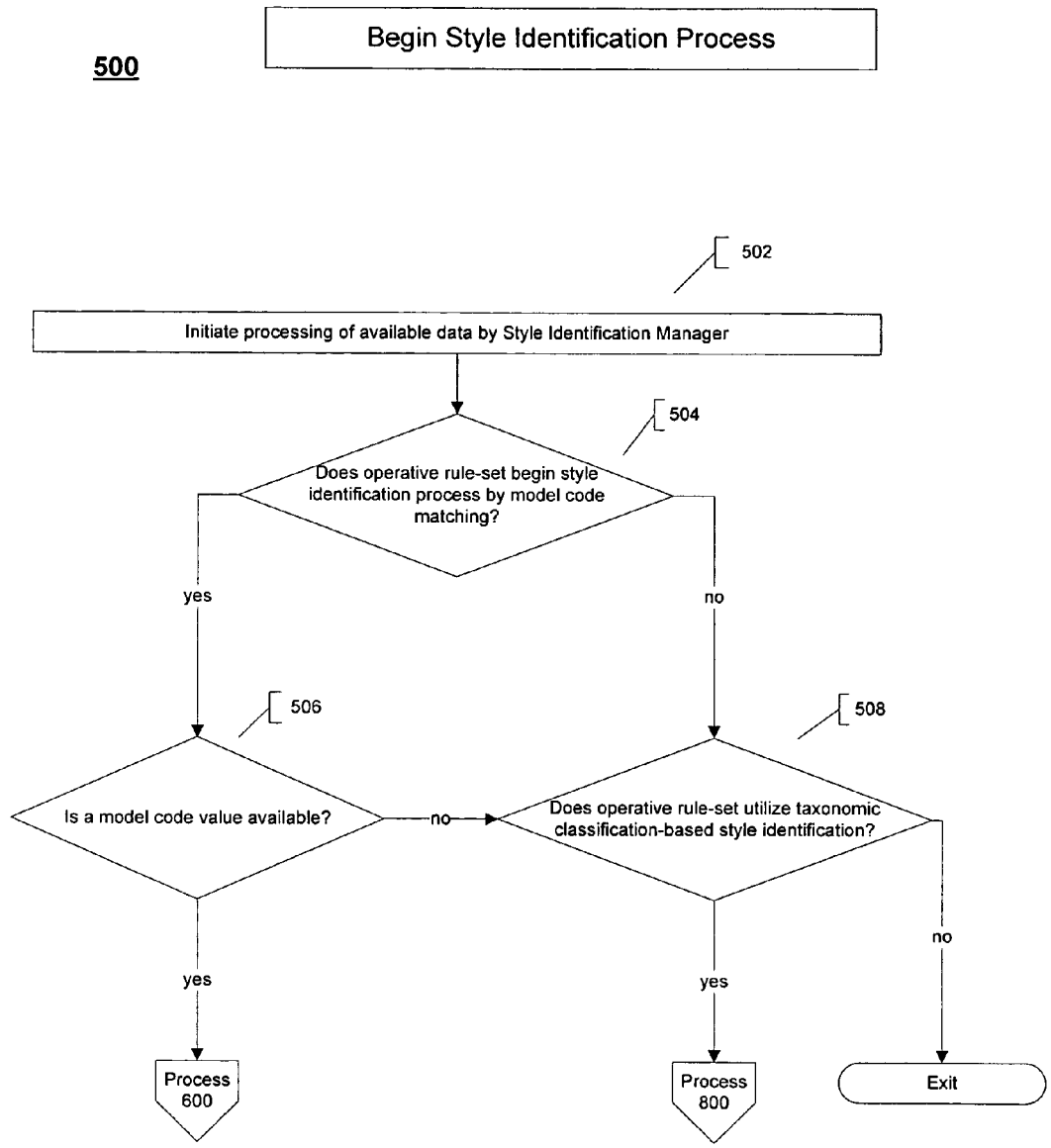
FIG. 5 is a flow chart of the first phase of an embodiment of the vehicle style identification process.

FIG. 5 provides a flow chart of the first phase 500 of one illustrative method for implementing the system's style identification manager 130. It should be emphasized that the implementation of the style identification method may, in other automotive domain embodiments, be changed in different respects for a number of reasons. Among other things, implementation logic may be varied based upon the kinds of vehicles 110 whose data is processed by the system 100, the base rates of different data element values being made available to a venue 122 from the sources 114 that typically provide vehicle data record feeds to the system 100, and the relative contributions in terms of style limiting or exact identification of different logical algorithms for the particular population of vehicles 110 typically processed by a system 100.

Also, in addition to rules 144 that trigger the activation of style identification processing in response to changes in values within a master vehicle data record 136 as discussed below, among other things an implementation may establish other rules that trigger phase 500 to begin based on certain system 100 events. For example, updates in memory 104 to style data 140 utilized by the style identification manager 128, such as the master list of styles for a make, mappings of style to reference units, or the associations of different vehicle attribute values with different styles, may trigger a system 100 default rule set 146 that instructs the vehicle processing manager 118 to activate the style identification manager 130 to re-process available data for a master vehicle data record's 134 venues 120 for which no style value is available.

As noted, among other things, phase 500 may begin after data within a vehicle's vehicle data record 112 received by the system 100 has been made available within the corresponding master vehicle data record 136 for potential use by one or more venues 122 after applicable processing by the assignment manager 126 and transformation manager 128 in accordance with appropriate rule set 146 as described above with reference to FIGS. 1 through 3. At this point, in accordance with a venue applicable rule set 146, the vehicle processing manager 124 may activate the style identification manager 130.

Rule set 146 may have various possible impacts on a vehicle processing manager's activation of a style identification manager 130. For example, a rule set 146 for a first venue 122 may instruct the vehicle processing manager 124 to activate the style identification manager 130 for the first venue 122, but a rule set 146 for a second venue 122 associated with the same master vehicle data record 136 may instruct the vehicle processing manager not to activate the style identification manager for the second venue 122.

In another example, a rule set 146 may instruct the vehicle processing manager 124 to activate the style identification manager 130 for a vehicle's venue 122 only if the values for a set of specified fields available for possible use by the venue 122 have been changed (created, modified, or deleted). The specified minimum set of field values may be selected, for instance, because they may be necessary for the style identification process to be potentially capable of sufficiently narrowing down the possible vehicle style for the venue 122, or because they may be necessary to ensure that application of style identification logic does not place undo burdens on server 102 processing capacities that may impede system 100 performance, among other things. Therefore, a rule set 146 may guide the vehicle processing manager 124 to make efficient use of server 102 data processing resources by activating the style identification manager 130 only when its likelihood of adding value to the data available to a venue 122 within a master vehicle data record 136 surpasses some pre-determined threshold. As such, selection of a minimum set of field values of this nature may be related to the logic used by the style identification manager 130 in a given implementation. Logic used by a style identification manager 130 in an illustrative implementation is discussed below.

When such style identification processing occurs multiple times for a vehicle 110 due to multiple venues 122 with which it is associated, the data available to each venue 122 may vary, and the various style rules 144 within each venue's 122 associated rule set 146 may differ from those in the other venues' rule set 146. Consequently, the style values made available to different venues 122 within a vehicle's master vehicle data record 136 may vary depending upon the venue data and applicable rule set 146.

In this implementation, among other things the default rule set 146 establishes a style identification pre-condition that values for the year and make fields must be available to the venue 122 within the vehicle's master vehicle data record 136. Among other things, doing so reduces the number of tables and amount of data that must be traversed by the style identification manager 130 in style data 140 as it operates, thereby improving system performance and making more efficient use of processing and memory resources in server 102. The vehicle data processing manager 124 verifies that this pre-condition is met prior to activating the style identification manager 130 to begin processing venue data by means of its style identification logic.

Additionally, it has been previously determined within the circumstances of the implementation that both a vehicle's model code value and its taxonomic classification values (i.e., which trim of which model of which year for a given make) may be strongly associated with styles that are themselves strongly associated with reference units corresponding to the reference datasets 138 of interest. Also, it has been previously determined that of these two types of information, a style identification process algorithm that first examines the model code value is the generally preferable approach and therefore is selected as the default first step in the absence of overriding rule set 146 instructions to the contrary. Embodiments for other implementations in this domain may elect to begin with taxonomic classification, or employ alternative style identification strategies that attempt to harness other types of information in addition to or instead of model code and taxonomic classification, such as by beginning with decoded VIN-based groupings that may be associated with vehicle styles. Further, in this sample embodiment, the implementation of only one of multiple possible venue-associated rule sets 146 is described using, for ease of explication, the triggering event of initial creation within the system 100 of a master vehicle data record 112 for a vehicle 110 associated with a venue 122, based upon receipt of a vehicle data record 112 for the vehicle 110.

Upon 502 initiation of the style identification manager 130, the style identification manager 130 may determine 504 whether its specific style identification rules 144 for the venue 122, if any, instruct the style identification manager 130 to first begin the style identification process by model code matching, i.e., attempting to match a vehicle's 110 model code value with one or more style values that may be mapped to it in style data 140. In the illustrative implementation, the style identification manager 130 defaults to beginning with the model code matching branch of the algorithm in the absence of specific instructions to the contrary within the rule set 146.

If the style identification manager 130 initiates style identification efforts for the vehicle's venue 122 by model code matching, a process wherein it first attempts to use the model code value that may be available to the venue 122 in the master vehicle data record 136 to search for an associated style in style data 140, the style identification manager 130 determines 506 whether a model code value is available to the venue 122. If such a value is present, process 600 is invoked. If a model code value is not present, or if the operative rule set 146 instructs it not to begin style identification efforts by means of model code matching, the style identification manager 130 determines 508 whether the operative rule set 146 utilizes a taxonomic classification-based style identification process, an approach that searches for one or more styles that may be associated with the vehicle's 110 taxonomic classification based on available data values. Again, in the sample implementation, the default rule 144 permits a taxonomic classification-based style identification process to be used. If this default rule 144 is not overridden, process 800 is invoked. If this default rule 144 is overridden and a taxonomic classification-based style identification process is not permitted, the style identification manager 130 exits vehicle style identification processing for the venue 122 within its master vehicle data record 136 and informs the vehicle processing manager 124 of that status.

Figure 6:
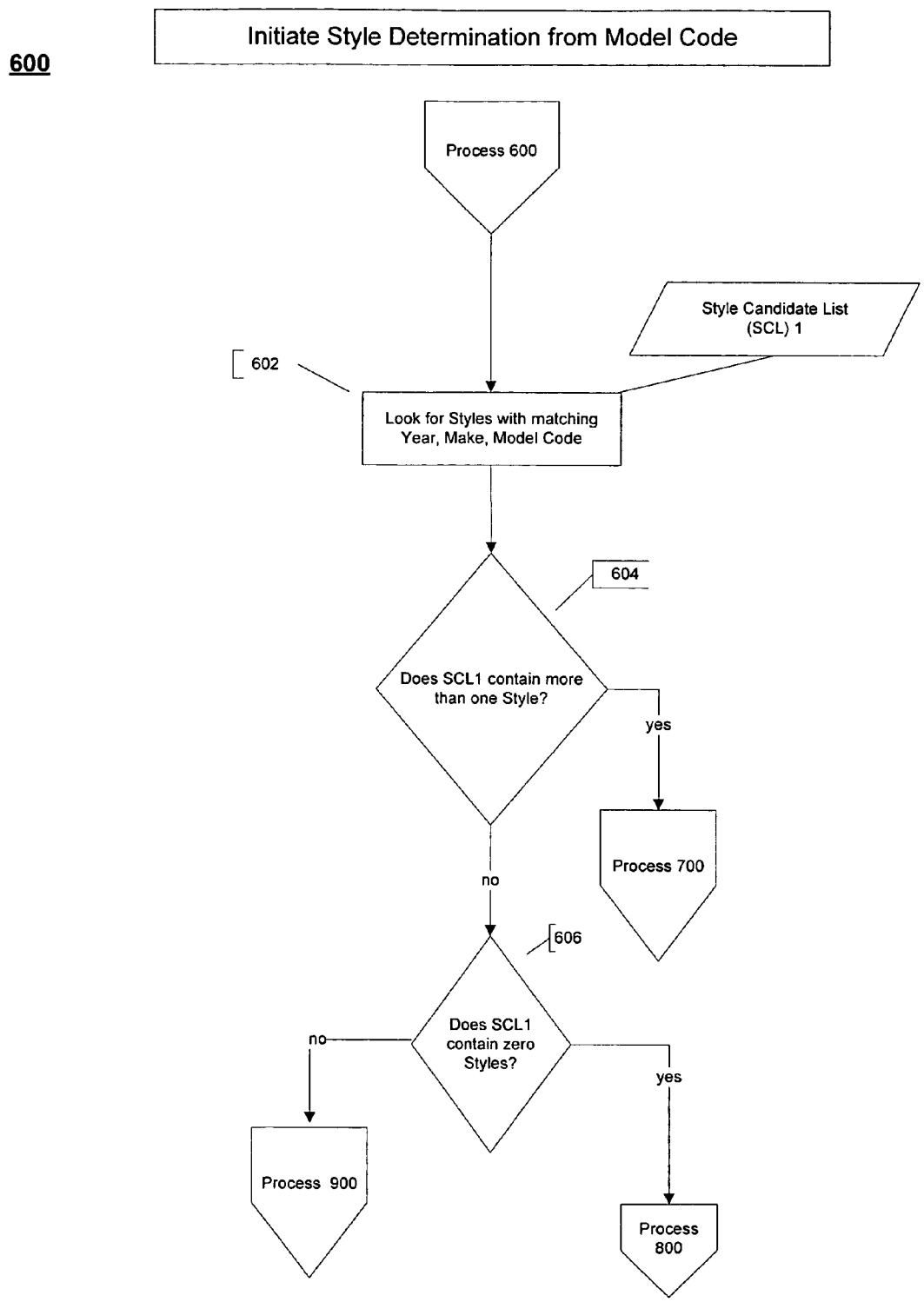
FIG. 6 is a flow chart of the initial logic used in examining manufacturer model codes within an embodied vehicle style identification process.

FIG. 6 depicts the initial process 600 used by the style identification manager 130 when it begins with a venue available model code value in its effort to find the smallest set of styles within which a vehicle 110 may fall for possible use by the venue 122. The style identification manager 130 accesses 602 style data 140 to find the set of style identifiers (styles) jointly associated with (mapped to or "matching") the year, make, and model code values available to the vehicle's 110 venue 122 within its master vehicle data record 136, and creates and populates a working or temporary style candidate list (SCL) in memory 106 with the set of results.

Style candidate lists serve in essence as temporary containers for the style processing step results of certain identified algorithmic branches that may be construed as "nominating" and then "pruning" the list of styles to which the vehicle 110 may possibly correspond for a venue 122. In this embodiment, two different style candidate lists are distinguished in order to contain the temporary results of two different style identification approaches that may be employed for the same set of vehicle venue-available data and then compared to determine the best style values to be output by the style identification manager 130. Style candidate lists SLC1 and SLC2 are further discussed below with reference to FIGS. 7, 8, and 9.

Figure 7:
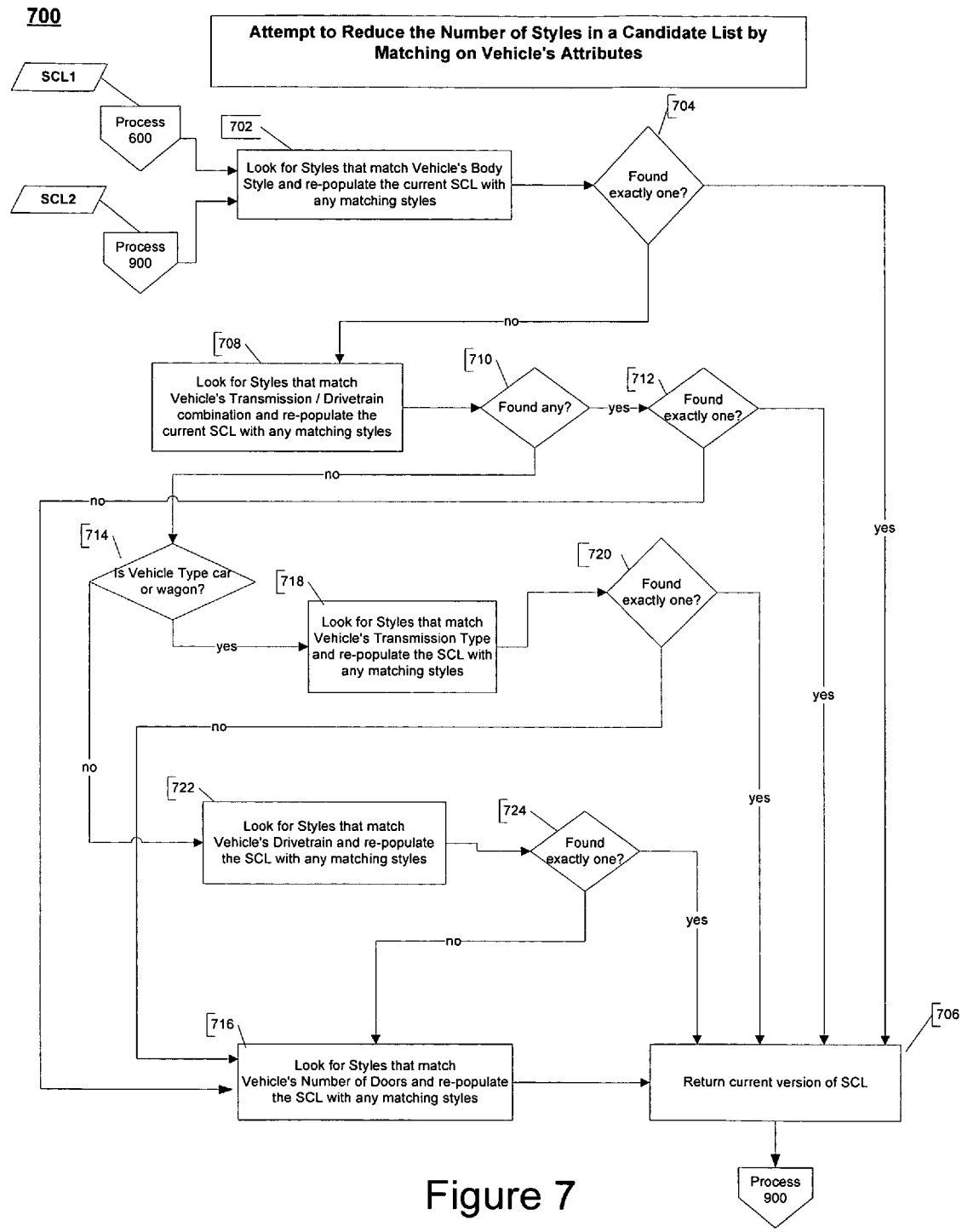
FIG. 7 is a flow chart for the phase of a vehicle identification process that attempts to use pertinent attributes of the vehicle and the candidate styles to further reduce a candidate list.

If after querying the list 604, the style identification manager 130 finds that it contains more than one matching style, then it invokes the process 700. If the list does not contain more than one style, then the style identification manager 130 determines 606 if the list contains zero styles. If the list is empty (contains zero matching styles), then process 800 is invoked. If the list is not empty (in other words, contains exactly one matching style), then process 900 is invoked FIG. 7 depicts the process 700 whereby the style identification manager 130 attempts to reduce the number of styles in a style candidate list by eliminating in a set sequence those styles in the list that are not associated with (characterized by) the vehicle's venue-available values of certain "indicator" attributes that may often distinguish between different closely related vehicle styles. When the style identification manager 130 invokes process 700 from process 600 as described above, it utilizes the style candidate list SLC1 created in step 602, which upon entering this branch contains more than one style. Style data 140 is first accessed to determine which styles currently populating the SLC1 have 702 the same body style value (e.g., sedan, coupe, convertible) that is available to characterize the vehicle 110 within the venue 122, and updates the candidate list to a more current version containing only those matching styles. If no body style value is available to characterize the vehicle 110, then the contents of the style candidate list remains the same, the current version of the list is retained, and the process proceeds to the next step.

If 704 the current version of the style candidate list contains exactly one style, then the process retains 706 the one style and proceeds to process 900. If not, then the style identification manager 130 accesses style data 140 to determine 708 which styles populating the current list have the same combination of transmission type (e.g., automatic, manual) and drivetrain type (e.g., front-wheel drive, rear-wheel drive, all-wheel drive) values that characterizes the vehicle 110, and updates the candidate list to a more current version containing only those matching styles.

The style identification manager 130 then queries 710 the list to see if it has been updated. If not (i.e., no matching styles were found, or an actual transmission/drivetrain combination value was not available for the vehicle 110), then it proceeds to step 714. If the list has been updated, then it determines 712 whether the attempt to match on the transmission/drivetrain combination value succeeded in reducing the list to a single style. If so, then the process retains 706 the current version of the list and proceeds to process 900. On the other hand, if the current version of the list contains more than one style, then the process proceeds to step 716.

As noted above, step 714 is invoked when no styles within the candidate list matched the vehicle's transmission/drivetrain combination value, or an actual transmission/drivetrain combination value was not available for the vehicle 108. Step 714 represents an attempt to reduce the relatively high hurdle posed in 708 of identifying potentially corresponding styles by matching on both the transmission and drivetrain values. Of special note, as elsewhere in the processes employed by the style identification manager, the logic here reflects the fruits of a domain-specific yield analysis of the different style-distinguishing attribute values in style data 140 and the available attribute values in the population of vehicles 110 to be processed by the sample implementation of system 100. Based on this analysis, in the current embodiment, the style identification algorithm proceeds next by attempting to reduce the candidate list's number of possibly corresponding styles for the vehicle 110 by matching on different indicators depending 714 upon the vehicle's vehicle type attribute value.

If 714 the vehicle's vehicle type is a car or wagon, then the style identification manager 130 accesses style data 140 to determine which styles populating the current list have 718 the same transmission type value as the vehicle 110. If 714 vehicle type is something other than a car or wagon, then it accesses style data 140 to determine which styles populating the current list have 722 the same drivetrain value as the vehicle 110. In the uncommon event that a vehicle type value is unavailable for the vehicle 110, based on an analysis of the base rates of vehicles 110 processed by the sample system implementation, under default rules 144 the vehicle 110 is assumed to be a car or wagon. As with other logic employed by the style identification manager 130 in the illustrative embodiment, venue specific rules may modify such logic, and in alternative implementations, different system defaults of this nature may be employed based upon vehicle population-specific analyses.

If after searching 718 for a match 720 on transmission type an updated candidate list is returned that contains only one style, then the process retains the current version of the list and proceeds to process 900. If not, then the style identification manager 130 proceeds to 716. Similarly, if after searching 722 in style data 140 for a match 724 on drivetrain type an updated candidate list is returned that contains only one style, then the process retains the current version of the list and proceeds to process 900. If not, then the style identification manager 130 proceeds to 716.

Finally, the style identification manager 130 accesses style data 140 to determine which styles populating the current list have 716 the same value for number of doors as the vehicle 110. Regardless of whether the style candidate list is updated as a result, as well as the number of remaining styles populating it after this step, the current list is retained 706, and the style identification manager 130 proceeds to process 900.

Figure 8:
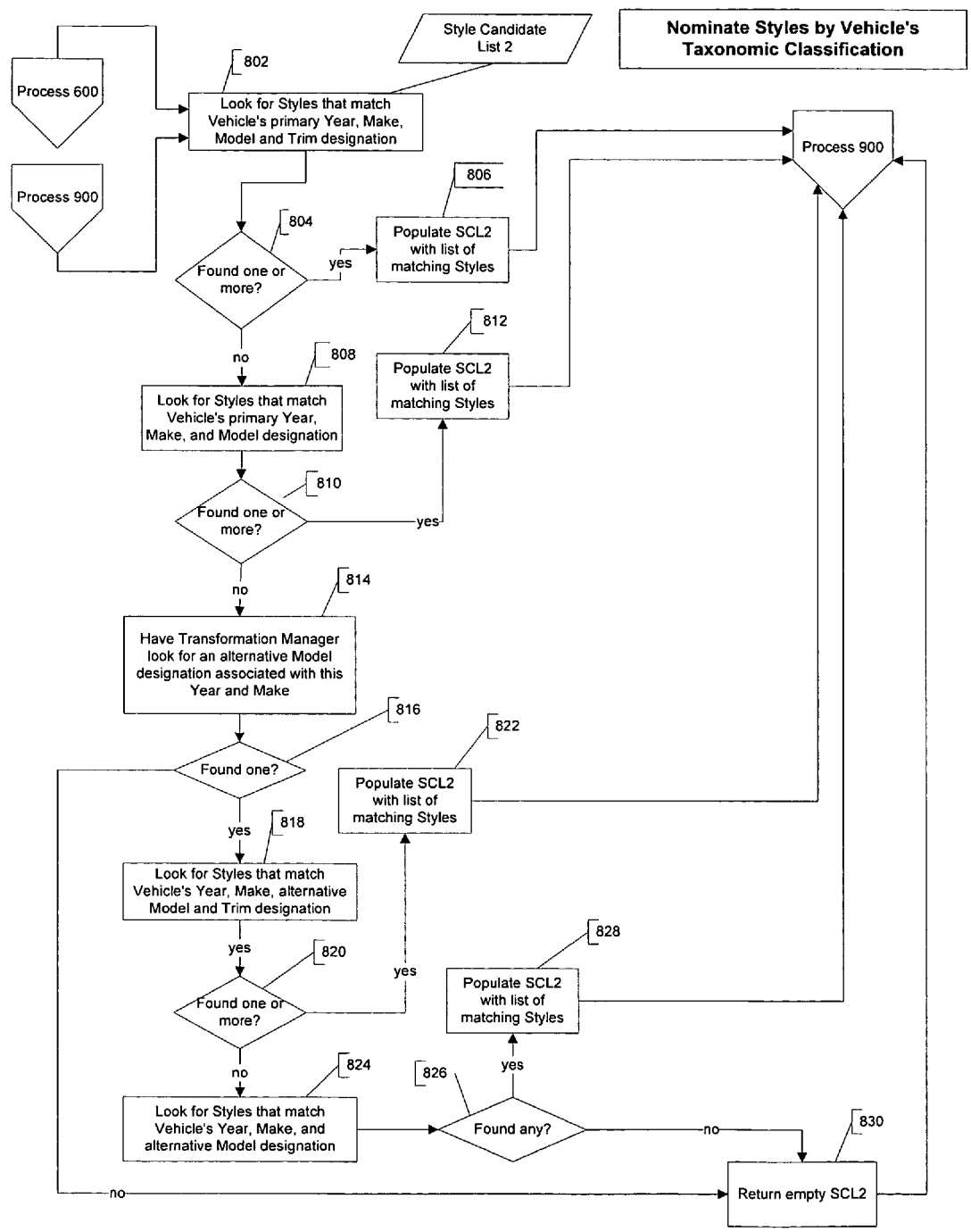
FIG. 8 is a flow chart for the phase of a vehicle identification process that may be invoked to use the pertinent taxonomic classification of the vehicle.

FIG. 8 depicts the process 800 whereby the style identification manager 130 attempts to nominate one or more candidate styles for a vehicle based upon its taxonomic classification at the trim or model level of the product classification hierarchy. It is emphasized here that an alternative process whereby the style identification manager 128 attempts to nominate one or more candidate styles for a vehicle based upon an analysis of its VIN may substitute for process 800 within the overall style identification algorithm and provide a style candidate list utilized in an equivalent manner to that provided by process 800 in later stages of the overall identification process. The process 800 may be triggered when the attempt 706 to nominate a set of candidate styles by model code matching in process 700 fails to yield any candidates. It may also be triggered by process 900 in an attempt to nominate a second set of candidate styles, derived from the taxonomic classification alternative to the model code nomination approach, that process 900 may later use in an effort to further reduce a set of multiple candidate styles remaining after narrowing efforts based upon vehicle style indicators by process 700. In either case, the set of zero or more candidate styles yielded by the taxonomic approach are returned at the end of process 800 to process 900, wherein the style identification manager 130 utilizes logic optimized for the needs of the illustrative implementation to select the best style by which to characterize the vehicle 110 for its venue 122. Process 900 is described in greater detail below with reference to FIG. 9.

The style identification manager 130 initiates process 800 by initializing 802 a new style candidate list SLC2 in memory 106 and accessing style data 140 to find the set of styles jointly matching the "primary" year, make, model, and trim designation values available to the vehicle's venue 122. The primary values represent the values derived for these attributes by the transformation manager 128 using default rules ordinarily optimized for determining them by "decoding" the respective information embedded in the VIN or, if that is unsuccessful, by looking up the corresponding system values for the unstructured text values made available to the venue 122 within the vehicle data record 112. If 804 one or more matching styles are found, it populates 806 the SCL2 with that set of styles and, retaining it, invokes process 900. Ordinarily, in this state, the list would represent the smallest and most accurate set of taxonomically-based candidate styles for the vehicle 110 because the trim node in the taxonomy represents the next smallest product class, falling just above the style class in the tree hierarchy.

If 804 no matching styles are found, the SCL2 remains empty, then the style identification manager 130 accesses 808 style data 140 to find the set of styles jointly matching the "primary" year, make, and model values available to the vehicle's venue 122. In essence, this constitutes an attempt to identify a set of at least some style candidates based upon the broader product class represented by the model node in the taxonomy. If 810 one or more matching styles are found, it populates 812 the SCL2 with that set of styles and, retaining it, invokes process 900.

If 810 no matching styles are found, the SCL2 remains empty and the style identification manager 130 prompts 814 the vehicle processing manager 124 to instruct the transformation manager 128 to attempt to derive an alternative to the primary model designation associated with the year and make for the venue 122. The intent here is to invoke a supplementation of the ordinary model identification logic employed by the transformation manager 128 at those usually infrequent times when its derived primary model designation proves ineffective in retrieving an associated set of styles. This may occur when VIN-decoding based model identification fails, for example due to the absence of a venue-available VIN (erroneously omitted from a vehicle data record 112 or not available to the source), and the transformation manager's "back-up" default logic of directly mapping model from the unstructured text label is also unsuccessful. Although the text label available to the venue 122 may suffice as a label when used by a venue 122, it may not exactly match the system's textual designation of the model value due to misspellings, abbreviations, or overloaded data elements in source systems, among other things. For example, the available model label value may be "Pathfinder Armada" when, in fact, the true model name is "Armada."

Consequently, the transformation manager 128 may attempt to match the available text label to a special list of common "aliases" for standard model labels maintained for the system 100 in other data 134, and if successful may return a derived alternative (standard) model value to the venue 122 that the style identification manager 130 may then be alerted to make use of by the vehicle processing manager 124. In the illustrative embodiment, this "anti-aliasing" occurs on an individual basis, triggered by the style identification manager 130, because in this system 100 implementation, the failure of primary model values to yield a set of styles is a relatively rare occurrence, and routine attempts by the transformation manager 128 to derive alternative model values for a venue 122 in advance of style identification processing would prove to be wasteful of server 102 resources.

In this regard, it may be noted that in this embodiment no effort is made to "anti-alias" make and trim designations because ordinary system filtering (e.g., text case standardization, removal of hyphens and other special characters) rectifies a sufficient percentage of errors and standardizes a sufficient degree of unstructured text data variation for the needs of the implementation. Other embodiments may elect to anti-alias make and trim designations and/or to have the transformation manager 128 conduct some or all anti-aliasing on a routine basis based on particular implementation needs and drivers.

If the style identification manager 130 determines 816 that an alternative model designation has been found, then it accesses style data 140 to find 818 the set of styles jointly matching the year, make, alternative model, and trim designation values. In essence, step 818 repeats step 802 now that a standard model designation is available to the venue 122 that may enable the style identification manager 130 to return to the trim node of the taxonomy to search for the taxonomically closest relevant set of styles to which the vehicle 110 may correspond. If 820 one or more matching styles are found, it populates 822 the SCL2 with that set styles and, retaining it, invokes process 900.

If no matching styles are found 820, the SCL2 remains empty, and the style identification manager 130 accesses style data 140 to find 824 the set of styles jointly matching the year, make, and alternative model values available to the vehicle's venue 122. If 826 one or more matching styles are found, it populates 828 the SCL2 with that set of styles and, retaining it, invokes process 900. However, if 826 there are no matching set of styles, then the style identification manager 130 returns the SCL2 in its empty (i.e., the list contains zero styles) state to process 900 because all reasonable taxonomically-based style nomination efforts have now been exhausted.

Figure 9:
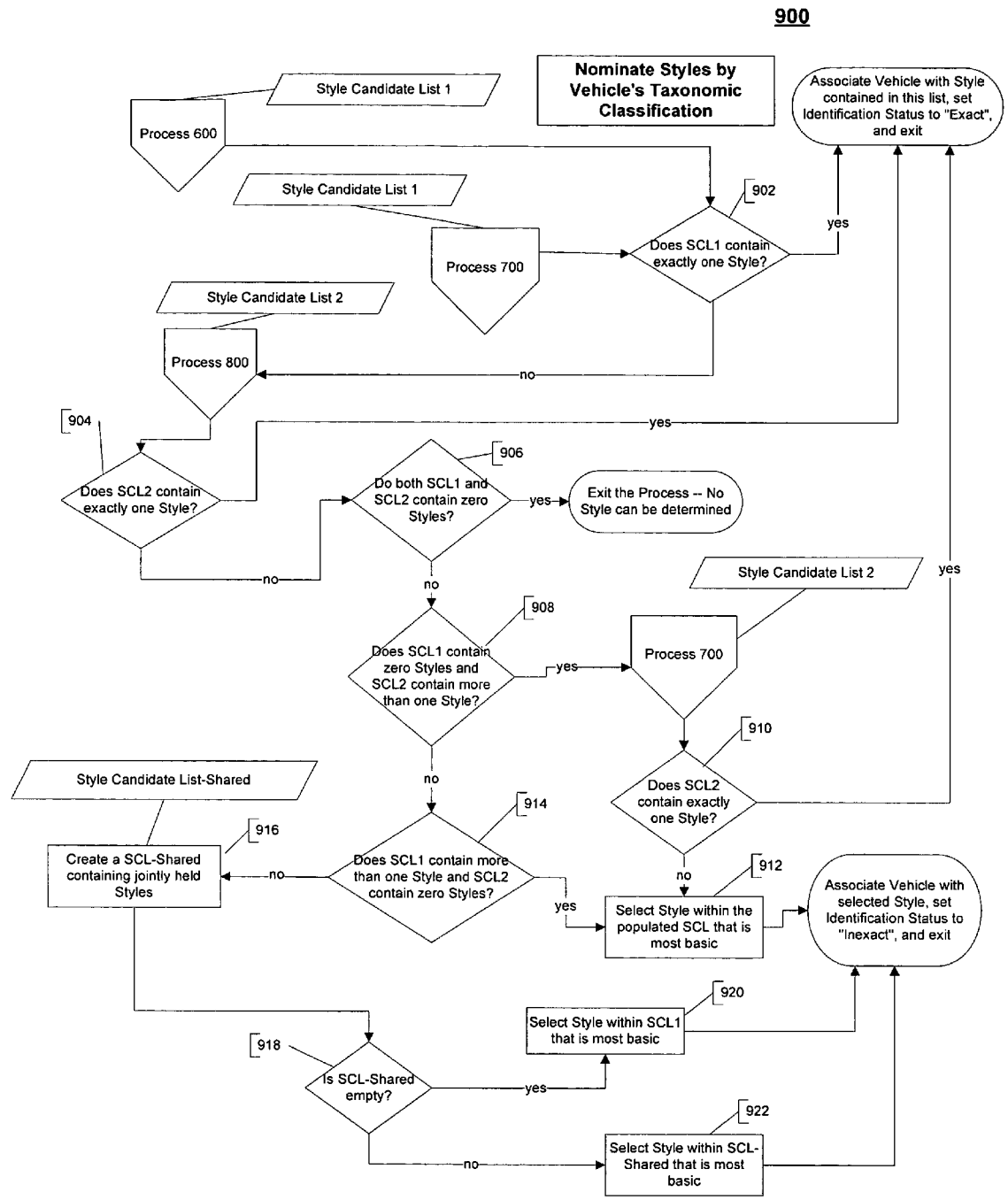
FIG. 9 is a flow chart for the final phase of a vehicle identification process.

FIG. 9 depicts the final process 900 whereby the style identification manager 130 optimizes determination of a style for the vehicle's venue 122 by resolving alternatives from amongst the sets of zero or more candidate styles that may have been nominated by the model-code and taxonomic-classification based logic described in reference to FIGS. 5 through 8 above. It is emphasized here that a style candidate list of zero or more candidate styles nominated by a VIN decoding process may substitute here for a taxonomic-classification based candidate style list 2 with no change in process 900. The style identification manager 130 may initiate process 900 by accepting 902 the set consisting of a single style comprising the SCL1, that represents one of the possible outcomes of processes 600 or 700 described above. In that eventuality, it returns the style value contained in SCL1 to the vehicle processing manager 124 for updating of the vehicle's venue 122 within the master vehicle data record 136.

In addition to the single style value, the style identification manager 130 also returns an identification status value of "exact", indicating that the provided style value represents a maximally precise algorithmic resolution of a single style from amongst one or more nominated candidates. As initiated here from process 600, the existence of a single candidate derived purely by matching a style to the available model code creates ipso facto an identification status of exact. As initiated from process 700, the set of more than one candidate was successfully winnowed to a single candidate by retaining only those styles sharing the examined indicator attributes. Having passed these values to the vehicle processing manager 124, the style identification manager 130 may exit the process 900.

If the SCL1 does not contain 902 exactly one style, then the style identification manager 130 retains the current version of the SCL1, containing either zero or many styles, and proceeds to process 800, described above. In this eventuality, the attempt to limit the list to a single candidate by retaining only those styles sharing the examined indicator attributes was unsuccessful. In essence, the style identification algorithm now attempts the secondary approach of seeking candidates by the taxonomic classification alternative in an effort to either obtain a single style "exact" identification or to derive another set of candidate styles that can be cross-referenced with that derived from model code and indicator matching (described in greater detail with reference to FIG. 9 below).

Upon the conclusion of process 800, the style identification manager 130 may examine 904 the returned SCL2 to determine whether an exact identification has occurred as a result of the taxonomic-classification based style nomination approach. If so, then the value of the list's single style is passed to the vehicle processing manager 124 along with an identification status value of "exact," and the process exits. In essence, the logic favors a single style nominated by the secondary approach over being forced to elevate one style over others nominated by the same primary model-code based approach. This reflects basic confidence in the accuracy of either approach as well as the implementation's assessed benefits, in terms of the needs of the inventory manager 108, of a definitive style identification over an inherently imprecise resolution among multiple alternatives. If the taxonomic approach of process 800 does not return a SCL2 containing only one style, then the style identification manager 130 examines 906 the contents of both SCL1 and SCL2 in order to choose among the alternatives. If both lists are empty (i.e., each list contains zero styles), then it returns a null style value to the vehicle processing manager 124 along with an identification status value of "unidentified" and exits the process, having been unable by either the model-code or taxonomic-classification based approaches to create a candidate set of one or more styles.

If both lists are not empty, then the style identification manager 130 examines the relative status of both lists to first determine 908 whether the SCL1 is empty (as a result of unsuccessful model-code based style nominating) but SCL2 contains more than one style based on taxonomic-based candidate nomination. If so, then it invokes process 700 and passes it SCL2 in an effort to determine whether indicator-based matching may reduce the number of candidate styles present on it that were generated by its taxonomic-based approach. In this case, process 700 proceeds as described above but works solely on SCL2. Upon the completion of process 700, the SCL2 is examined 910 to determine whether indicator-based matching reduced it to a single style. If so, then the style identification manager 130 returns that style value to the vehicle processing manager 124 along with an identification status value of "exact" and exits the process.

If not, then it is unable to make an exact identification and, in order to achieve some level of style identification, may only select 912 a style from the two or more styles on SCL2 that meets some criterion established by the needs of the implementation. In the current embodiment, the style identification manager 130 selects 912 the style within the list that is most basic or least well equipped because auto dealers and other entities controlling vehicles 110 managed by the inventory manager 108 prefer to err on the side of under—rather than over—representing the equipment and features of their vehicles 110. This decision is an understandable one given the existence of fairly stringent consumer protection laws in the automotive retail industry that, for example, may penalize dealers if they represent a vehicle 110 as having a better level of equipment than present in the actual vehicle. Consequently, in the illustrative embodiment, this regulatory risk is managed by selecting the most basic style in the list, as determined by the corresponding base trim with the lowest manufacturer list price (MSRP), and returning it along with an identification status value of "inexact" to the vehicle processing manager 124. This status value may then be used by other parts of the inventory manager 108 to mediate how data associated with the identified style may be interpreted by venue logic, for example by triggering special accompanying disclaimer language when the venue 122 elects to make use of reference datasets 138 associated with the inexactly identified style value.

In the event 908 that the joint condition of SCL1 being empty and SCL2 containing more than one style is not met, then the style identification manager 130 determines 914 whether SCL1 contains more than one style and SCL2 is empty. If so, then it employs the same method 912 of selecting the most basic style in the SCL1 and returning it along with an identification status value of "inexact" to the vehicle processing manager 124, and then exiting the process 900. If not (in other words, both lists contain more than one style), then the style identification manager 130 initializes 916 a third style candidate list-shared in memory 106 and populates it with those styles that are common to (found in) both lists.

The style identification manager 130 then determines 918 whether the list-shared is empty, meaning that there is no overlap in styles present in (model-code/indicator based) SCL1 and (taxonomic-classification based) SCL2. If list-shared is empty, then it selects 920 the most basic style present in SCL1 and returns it along with an identification status value of "inexact" to the vehicle processing manager 124 and then exits the process 900. In essence, this logic is based within the illustrative embodiment on a greater confidence in candidates emerging from the model-code based nomination approach than from the taxonomic-classification based approach. Again, this preference reflects an assessment of a number of factors in the implementation, such as varying data quality, timeliness and coverage within vehicle data records 112 from different sources 114, within style data 140, and within other data 134, which includes aliasing data discussed above. As such, choosing 920 to default to inexact identifications based on SCL1 rather than SCL2 represents the needs of one implementation scenario, and the circumstances of different implementations may impel different logic.

If, on the other hand, the style identification manager 130 determines 918 that the style candidate list-shared is not empty, then it selects 922 the style within the list-shared that is most basic, returning it and an identification status value of "inexact" to the vehicle processing manager 124, and then exits the process 900. In essence, the selection of this logic reflects an increased confidence in the list of candidate styles resulting from both nomination approaches, and represents a more precise, albeit still inexact, effort to select the most basic style from a narrower list and therefore be less likely to excessively under-represent the vehicle 110 for the venue 122.

In sum, optimizing the precision whereby a standard granular product class is identified, making the inference rules clear with regard to confidence in different kinds and sources of data, and establishing clear mechanisms for erring towards under- or over-representation offers substantial value to the users of such a system 100. Insofar as much product, including automotive passenger vehicle, information is in the form of unstructured text, identifying a single style even inexactly often provides access to a substantial body of reference information that is not available in the form of structured, normalized data that might otherwise be mapped in a relational schema to sets of multiple product instances. Consequently, substantial amounts of product information, especially media, are grouped at the standard product class or style level of granularity and their presence cannot be mapped to product instances such as vehicles 108 when those styles are not resolved below certain levels.

Having derived from the above-described operation of the style identification manager 130 a style value and accompanying identification status value for a vehicle's venue 122, the vehicle processing manager 124 may now directly populate these fields within a master vehicle data record 136 or prompt the augmentation manager 132 to do so. Once this has occurred, operative rule set 146 may be activated that instruct the augmentation manager 132 to make various new information available for possible use by venues 122, among other things by using the style identifier as a key to the appropriate data subsets within reference datasets 138. In doing so, the augmentation manager 132 may populate new data fields, often including blocks of unstructured text or media, in a vehicle's venue 122. Such information may prove to be very valuable to audiences accessing various venues 122, such as automobile shoppers.

One type of augmentation of vehicle data that may be made available for possible use by a venue 122 is the addition of unstructured brand-specific information and marketing language that may co-exist with generic structured data derived from vehicle data records 112, possibly through look-ups undertaken by the transformation manager 128.

For example, AudiUSA may have certain goals for all of its AudiUSA-sponsored franchise websites, including the website for a fictitious "Audi of Wyoming" franchise. One of the goals for this particular venue 122 might be brand differentiation via marketing-oriented vehicle descriptions that consistently employ brand-specific vehicle descriptors, such as the Audi "FrontTrak" term for its front wheel drive system. In order to accomplish this, the augmentation manager 132 may be instructed by certain rules 144 within the venue-corresponding rule set 146 by which to employ the style value for a given Audi vehicle 110 on the lot in order to access the appropriate subset of an Audi-specific reference dataset 138 that features terminology describing the drive wheels system for this vehicle style as "FrontTrak."

On the other hand, an individual dealer may have different goals for a separately branded and controlled website featuring brands from multiple franchises. Continuing with the example above, Cody Montana, the owner of the Audi of Wyoming franchise, also owns Jaguar and Nissan franchises and sponsors his independent "Cody's Car Ranch" website venue for his dealership that features all three vehicle brands. In line with this website's goals, Cody might want to provide comparable descriptors across all of these brands, such as "front wheel drive" for all vehicles featuring that type of drive wheel system. Therefore, depending upon the reference datasets 138 available to the system, Cody might require that the augmentation manager 132 employ a different set of rules 144 by which to associate the same given Audi vehicle through its style identifier to a different reference dataset 138 consisting of generic descriptors, in which for example the value associated with this vehicle's drive wheel system is "front wheel drive." Consequently, visitors viewing Cody's Audi inventory on the Audi of Wyoming website might see this unique vehicle's drive wheels system described as "FrontTrak," while visitors to Cody's independent "Cody's Car Ranch" website might see this same unique vehicle's drive wheels system described as "front wheel drive."

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system to provide attributes of a vehicle available in an inventory to a plurality of different venues for providing vehicle information, each venue associated with a respective venue entity, the system comprising:
   a vehicle data record stored on a non-transitory computer-readable storage medium, the vehicle data record comprising a plurality of source-attribute pairs, each source-attribute pair comprising an attribute value corresponding to the vehicle and identifying a respective source of the attribute value;
   a plurality of availability rules stored on a non-transitory computer-readable storage medium specifying which of the plurality of venues are to have available attribute values associated with attribute value sources, wherein the availability rules are based upon business relationships between the venue entity and the attribute value sources, wherein a business relationship comprises one of a sponsored dealer and a manufacturer of the vehicle and a dealer group and a manufacturer of the vehicle;
   a computing device comprising an augmentation manager and an assignment manager;
   the augmentation manager configured to access a vehicle style database comprising a plurality of vehicle styles, each vehicle style comprising a plurality of reference attribute values shared by vehicles of a particular vehicle style, to select one of the vehicle styles in the vehicle style database using the vehicle data record, and to augment the vehicle data record with source-attribute pairs derived from the selected vehicle style; and
   an assignment manager operating on a computing device and configured to provide vehicle information to a first one of the plurality of venues by,
      accessing the augmented vehicle data record and the availability rules,
      applying the availability rules to the augmented vehicle data record to identify source-attribute pairs of the augmented vehicle data record that are from sources available to the first venue according to the availability rules, and
      providing a first set of attribute values to the first venue, the first set comprising attribute values of the identified source-attribute pairs.

2. The system of claim 1, wherein the augmentation manager selects the selected vehicle style by matching a granular standard vehicle class attribute value of the vehicle data record with a vehicle style in the vehicle style database.

3. The system of claim 2, wherein the granular standard vehicle class attribute is a model code value.

4. The system of claim 1, wherein the augmentation manager is to select the selected vehicle style using a taxonomic classification comprising matching one or more attribute values of the vehicle data record with reference attribute values of vehicle styles in the vehicle style database.

5. The system of claim 1, wherein the augmentation manager identifies a plurality of candidates for the selected vehicle style by comparing a first attribute value of the vehicle data record to vehicle styles in the vehicle style database, and eliminates candidate vehicle styles that are not associated with a second attribute value of the vehicle data record.

6. The system of claim 1, further comprising a transformation manager configured to modify an attribute value available to the first venue using a transformation rule of the first venue, wherein the transformation manager is configured to augment the vehicle data record by adding the modified attribute value to the vehicle data record.

7. The system of claim 1, wherein the augmentation manager is configured to augment the vehicle data record responsive to detecting a change in the vehicle style database.

8. The system of claim 1, wherein the augmentation manager is configured to augment the vehicle data record responsive to detecting a change to the availability rules.

9. The system of claim 1, wherein the augmentation manager is configured to select the selected vehicle style using a subset of the attribute values of the vehicle data record, the subset comprising the attribute values of the vehicle data record that are available to the first venue as determined by the availability rules and sources of the attribute values of the vehicle data record.

10. The system of claim 1, further comprising a transformation manager to modify one or more of the attribute values of the vehicle data record, and wherein the augmentation manager uses one or more of the modified attribute values to select the selected vehicle style in the vehicle style database.

11. The system of claim 10, wherein the transformation manager provides one or more aliases for standard style label elements to the augmentation manager, and wherein the augmentation manager uses the one or more aliases to select the selected vehicle style.

12. The system of claim 1, wherein the assignment manager provides a second set of attribute values to a second venue, wherein the first set comprising an attribute value that is not included in the second set, and
wherein the first venue has a business relationship with a manufacturer of the vehicle and the second venue does not have a business relationship with the manufacturer, and
wherein the availability rules specify that the first venue is to have access to attribute values sourced from the manufacturer and that the second venue does not have access to attribute values sourced from the manufacturer.

13. A method for providing attributes associated with a vehicle available in an inventory to a plurality of different venues for providing vehicle information, each venue associated with a respective venue entity, the system comprising:
accessing at a computing device a vehicle data record comprising a plurality of source-attribute pairs, each source-attribute pair comprising an attribute value corresponding to the vehicle in the inventory and identifying a respective source of the attribute value;
accessing at the computing device, availability rules specifying which of the plurality of venues are to have available attribute values associated with attribute value sources, wherein the availability rules are based upon business relationships between the venue entity and the attribute value sources, wherein a business relationship comprises one of a sponsored dealer and a manufacturer of the vehicle and a dealer group and a manufacturer of the vehicle;
accessing at the computing device a vehicle style database comprising a plurality of vehicle styles, each vehicle style comprising reference attribute values shared by vehicles of a particular vehicle style;
selecting by the computing device one of the plurality of vehicle styles in the vehicle style database using the attribute values of the vehicle data record;
generating an augmented vehicle data record by adding one or more reference attribute values of the selected vehicle style to the vehicle data record, the one or more reference attribute values comprising attribute values not previously included in the vehicle data record; and
selecting from the augmented vehicle data record, a first set of attribute values to be available to a first one of the plurality of venues by,
accessing the augmented vehicle data record and the availability rules,
applying the availability rules to the augmented vehicle data record to identify source-attribute pairs of the augmented vehicle data record that are from sources available to the first venue according to the availability rules, and
providing a first set of attribute values to the first venue, the first set comprising attribute values of the identified source-attribute pairs.

14. The method of claim 13, wherein selecting the selected vehicle style comprises, determining one or more candidates for the selected vehicle style by matching a granular standard vehicle class attribute value of the vehicle data record with vehicle styles in the vehicle style database, wherein the selected vehicle style is selected from the candidate vehicle styles.

15. The method of claim 14, wherein the granular standard vehicle class attribute value comprises a model code value.

16. The method of claim 13, wherein the selected vehicle style is selected using a taxonomic classification comprising matching one or more attribute values of the vehicle data record with reference attribute values of vehicle styles in the vehicle style database.

17. The method of claim 13, further comprising:
identifying a plurality of candidate vehicle styles by comparing a first attribute value of the vehicle data record to vehicle styles in the vehicle style database; and
eliminating candidate vehicle styles that are not associated with a second attribute value of the vehicle data record.

18. The method of claim 13, further comprising:
transforming one or more attribute values of the first set to produce one or more modified attribute values using a transformation rule of the first venue, and
adding the one or more modified attribute values to the vehicle data record.

19. The method of claim 13, further comprising detecting a change in the vehicle style database, wherein the selected vehicle style is selected responsive to detecting the change in the vehicle style database.

20. The method of claim 13, further comprising identifying a set of the attribute values of the vehicle data record that are not available to the first venue, wherein the selected vehicle style is selected without using any of the attribute values of the identified set.

21. The method of claim 13, further comprising transforming one or more of the attribute values available to the first venue, wherein the selected vehicle style is selected using one or more of the transformed attribute values.

22. The method of claim 21, wherein one or more of the transformed attribute values comprises an alias for a standard style label element, and wherein the alias is used to select the selected vehicle style.

23. The method of claim 13, further comprising determining whether the vehicle data record includes one or more required attribute values, wherein the selected vehicle style is selected when the one or more required attribute values are included in the vehicle data record.

24. The method of claim 13, wherein the first venue comprises a website, and wherein the first set of attribute values are displayed on the website to one or more users via a network.

25. The method of claim 13, wherein selecting the selected vehicle style comprises populating a first style candidate list with candidate vehicle styles based on matching a granular standard product class attribute value of the vehicle data record to vehicle styles in the vehicle style database, wherein the selected vehicle style is selected from the first style candidate list.

26. The method of claim 25, the method further comprising:
comparing a second attribute value of the vehicle data record with each candidate vehicle style of the first style candidate list; and
eliminating candidate vehicle styles from the first style candidate list that do not match the second attribute value.

27. The method of claim 13, wherein selecting the selected vehicle style comprises populating a first style candidate list with candidate vehicle styles using a taxonomic classification comprising matching one or more attribute values of the vehicle data record with reference attribute values of the vehicle styles in the vehicle style database, wherein the selected vehicle style is selected from the first style candidate list.

28. The method of claim 27, the method further comprising:
comparing a second vehicle attribute value with each candidate vehicle style of the first style candidate list; and
eliminating candidate vehicle styles from the first style candidate list that do not match the second vehicle attribute value.

29. The method of claim 13, wherein the vehicle styles correspond to vehicle types.

30. A non-transitory computer readable storage medium including computer readable instruction code for causing a computing device to perform a method for providing attributes associated with a vehicle available in an inventory to a plurality of different venues for providing vehicle information, each venue associated with a respective venue entity, the method comprising:
accessing a vehicle data record comprising a plurality of source-attribute pairs, each source-attribute pair comprising an attribute value corresponding to the vehicle in the inventory and identifying a respective source of the attribute value;
accessing at the computing device, availability rules specifying which of the plurality of venues are to have available attribute values associated with attribute value sources, wherein the availability rules are based upon business relationships between the venue entity and the attribute value sources, wherein a business relationship comprises one of a sponsored dealer and a manufacturer of the vehicle and a dealer group and a manufacturer of the vehicle;
accessing a vehicle style database comprising a plurality of vehicle styles, each vehicle style comprising reference attribute values shared by vehicles of a particular vehicle style;
selecting one of the plurality of vehicle styles in the vehicle style database using the attribute values of the vehicle data record;
generating an augmented vehicle data record by adding one or more reference attribute values of the selected vehicle style to the vehicle data record, the one or more reference attribute values comprising attribute values not previously included in the vehicle data record; and
selecting from the augmented vehicle data record, a first set of attribute values to be available to a first one of the plurality of venues by,
accessing the augmented vehicle data record and the availability rules,
applying the availability rules to the augmented vehicle data record to identify source-attribute pairs of the augmented vehicle data record that are from sources available to the first venue according to the availability rules, and
providing a first set of attribute values to the first venue, the first set comprising attribute values of the identified source-attribute pairs.

31. The computer readable medium of claim 30, wherein selecting the selected vehicle style comprises, determining one or more candidates for the selected vehicle style by matching a granular standard vehicle class attribute value of the vehicle data record with vehicle styles in the vehicle style database, wherein the selected vehicle style is selected from the candidate vehicle styles.

32. The computer readable medium of claim 31, wherein the granular standard vehicle class attribute value comprises a model code value.

33. The computer readable medium of claim 30, wherein the selected vehicle style is selected using a taxonomic classification comprising matching one or more attribute values of the vehicle data record with reference attribute values of vehicle styles in the vehicle style database.

34. The computer readable medium of claim 30, the method further comprising:
identifying a plurality of candidate vehicle styles by comparing a first attribute value of the vehicle data record to vehicle styles in the vehicle style database; and
eliminating candidate vehicle styles that are not associated with a second attribute value of the vehicle data record.

35. The computer readable medium of claim 34, the method further comprising:
transforming one or more attribute values of the first set to produce one or more modified attribute values using a transformation rule of the first venue, and
adding the one or more modified attribute values to the vehicle data record.

36. The computer readable medium of claim 30, the method further comprising detecting a change in the vehicle style database, wherein the selected vehicle style is selected responsive to detecting the change in the vehicle style database.

37. The computer readable medium of claim 30, the method further comprising identifying a set of the attribute values of the vehicle data record that are not available to the first venue, wherein the selected vehicle style is selected without using any of the attribute values in the identified set.

38. The computer readable medium of claim 30, further comprising transforming one or more of the attribute values available to the first venue, wherein the selected vehicle style is selected using one or more of the transformed attribute values.

39. The computer readable medium of claim 38, wherein one or more of the transformed attribute values comprises an alias for a standard style label element, and wherein the alias is used to select the selected vehicle style.

40. The computer readable medium of claim 30, the method further comprising determining whether the vehicle data record includes one or more required attribute values, wherein the selected vehicle style is selected when the one or more required attribute values are included in the vehicle data record.

41. The computer readable medium of claim 30, wherein the first venue comprises a website, and wherein the first set of attribute values are displayed on the website to one or more users via a network.

42. The computer readable medium of claim 30, wherein selecting the selected vehicle style comprises populating a first style candidate list with candidate vehicle styles based on matching a granular standard vehicle class attribute value of the vehicle data record to vehicle styles in the vehicle style database, wherein the selected vehicle style is selected from the first style candidate list.

43. The computer readable medium of claim 42, the method further comprising:
 comparing a second attribute value of the vehicle data record with each candidate vehicle style of the first style candidate list; and
 eliminating candidate vehicle styles from the first style candidate list that do not match the second attribute value.

44. The computer readable medium of claim 30, wherein selecting the selected vehicle style comprises populating a first style candidate list with candidate vehicle styles using a taxonomic classification comprising matching one or more attribute values of the vehicle data record with reference attribute values of the vehicle styles in the vehicle style database, wherein the selected vehicle style is selected from the first style candidate list.

45. The computer readable medium of claim 44, the method further comprising:
 comparing a second vehicle attribute value with each candidate vehicle style of the first style candidate list; and
 eliminating candidate vehicle styles from the first style candidate list that do not match the second vehicle attribute value.

46. The computer readable medium of claim 30, wherein the vehicle styles correspond to vehicle types.

* * * * *

UNITED STATES PATENT AND TRADEMARK OFFICE
CERTIFICATE OF CORRECTION

| | | |
|---|---|---|
| PATENT NO. | : 8,275,717 B2 | Page 1 of 1 |
| APPLICATION NO. | : 11/525009 | |
| DATED | : September 25, 2012 | |
| INVENTOR(S) | : Ullman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 947 days.

Signed and Sealed this
Sixteenth Day of December, 2014

Michelle K. Lee
*Deputy Director of the United States Patent and Trademark Office*